(12) United States Patent
Liu et al.

(10) Patent No.: US 12,140,991 B2
(45) Date of Patent: Nov. 12, 2024

(54) METHOD FOR PROVIDING CLOCK FREQUENCIES FOR COMPUTING CORES, CHIP AND DATA PROCESSING DEVICE

(71) Applicant: SHENZHEN MICROBT ELECTRONICS TECHNOLOGY CO., LTD., Guangdong (CN)

(72) Inventors: Jianbo Liu, Guangdong (CN); Weibin Ma, Guangdong (CN); Lihong Huang, Guangdong (CN); Zuoxing Yang, Guangdong (CN); Haifeng Guo, Guangdong (CN)

(73) Assignee: SHENZHEN MICROBT ELECTRONICS TECHNOLOGY CO., LTD., Guangdong (CN)

( * ) Notice: Subject to any disclaimer, the term of this patent is extended or adjusted under 35 U.S.C. 154(b) by 86 days.

(21) Appl. No.: 17/911,604

(22) PCT Filed: Apr. 12, 2021

(86) PCT No.: PCT/CN2021/086575
§ 371 (c)(1),
(2) Date: Sep. 14, 2022

(87) PCT Pub. No.: WO2021/208846
PCT Pub. Date: Oct. 21, 2021

(65) Prior Publication Data
US 2023/0123281 A1     Apr. 20, 2023

(30) Foreign Application Priority Data

Apr. 14, 2020     (CN) .......................... 202010288797.5

(51) Int. Cl.
*G06F 1/00*     (2006.01)
*G06F 1/08*     (2006.01)

(52) U.S. Cl.
CPC ..................................... *G06F 1/08* (2013.01)

(58) Field of Classification Search
CPC .......................................................... G06F 1/08
See application file for complete search history.

(56) References Cited

U.S. PATENT DOCUMENTS

| | | | |
|---|---|---|---|
| 7,996,743 B1 * | 8/2011 | Tan ................... | G01R 31/31727 714/744 |
| 9,391,615 B2 * | 7/2016 | Shin ................... | H03K 19/0016 |

(Continued)

FOREIGN PATENT DOCUMENTS

| | | |
|---|---|---|
| CN | 103376874 A | 10/2013 |
| CN | 107239348 A | 10/2017 |

(Continued)

OTHER PUBLICATIONS

First Office Action issued in Chinese Patent Application No. 202010288797.5.

(Continued)

*Primary Examiner* — Mohammed H Rehman
(74) *Attorney, Agent, or Firm* — Dickinson Wright PLLC

(57) ABSTRACT

The present disclosure relates to a method for providing clock frequencies for computing cores, a chip and a data processing device. The method includes: causing a main clock frequency unit to provide a first main clock frequency for computing cores; testing the computing cores operating at the first main clock frequency to determine whether a pass rate of the computing cores is greater than an upper threshold or less than a lower threshold; when the pass rate is less than the lower threshold, causing an auxiliary clock frequency unit to provide a lower first auxiliary clock frequency for computing cores abnormally operating, causing the main clock frequency unit to providing the first main clock frequency for the remaining computing cores; when the pass rate is greater than the upper threshold, causing the (Continued)

main clock frequency unit to provide a higher second main clock frequency for the computing cores.

20 Claims, 4 Drawing Sheets

(56) References Cited

U.S. PATENT DOCUMENTS

| | | | |
|---|---|---|---|
| 2010/0262879 A1* | 10/2010 | Floyd | G01R 31/31724 |
| | | | 714/E11.155 |
| 2015/0149800 A1 | 5/2015 | Gendler et al. | |
| 2018/0276052 A1* | 9/2018 | Kim | G06F 9/524 |
| 2019/0124712 A1 | 4/2019 | Ding et al. | |
| 2020/0294180 A1* | 9/2020 | Koker | G06T 1/20 |
| 2020/0294181 A1* | 9/2020 | Matam | G06F 13/4027 |

FOREIGN PATENT DOCUMENTS

| | | | | |
|---|---|---|---|---|
| CN | 108983069 A | | 12/2018 | |
| CN | 108984469 A | * | 12/2018 | ......... G06F 15/7803 |
| CN | 109002356 A | | 12/2018 | |
| CN | 109086130 A | | 12/2018 | |
| CN | 110770712 A | | 2/2020 | |
| CN | 111506154 A | | 8/2020 | |
| TW | 201430553 A | | 8/2014 | |
| TW | 201643597 A | | 12/2016 | |
| TW | 201643714 A | | 12/2016 | |
| TW | 201704931 A | | 2/2017 | |
| TW | 201716926 A | | 5/2017 | |

OTHER PUBLICATIONS

Second Office Action issued in Chinese Patent Application No. 202010288797.5.
First Office Action issued in Taiwanese Patent Application No. 110113125.
International Search Report and Written Opinion mailed Jul. 15, 2021 in International PatentCN2021/086575.
Notification to Grant Patent Right for Invention issued in Chinese Patent Application No.
First Supplementary Search Report issued in Chinese Patent Application No. 202010288797.5.
Second Supplementary Search Report issued in Chinese Patent Application No. 202010288797.5.
First Search Report issued in Chinese Patent Application No. 202010288797.5.
Patentability International Preliminary Report mailed Apr. 14, 2020 in International Patent Application PCT/ CN2021/086575.
Rejection Decision issued in Taiwanese Patent Application No. 110113125.

* cited by examiner

METHOD FOR PROVIDING CLOCK FREQUENCIES FOR COMPUTING CORES, CHIP AND DATA PROCESSING DEVICE

CROSS-REFERENCE TO RELATED APPLICATIONS

This application is a national stage of International Application No. PCT/CN2021/086575, filed on Apr. 12, 2021, which claims priority to Chinese Patent Application No. 202010288797.5, filed on Apr. 14, 2020. Both of the aforementioned applications are hereby incorporated by reference in their entireties.

TECHNICAL FIELD

The present disclosure relates to the technical field of computers, in particular to a method for providing clock frequencies for computing cores, a chip having computing cores and a data processing device including the chip, and further relates to a method and a system for improving computing power and decreasing a power consumption-computing power ratio for a computer having a plurality of computing cores.

BACKGROUND

With the development of the computer technology, various computers having super computing power have emerged, which can be applied to various application fields requiring strong computing power, for example, to serve as virtual currency mining machines for mining virtual currency. In general, such a computer can include a plurality of chips, each of which has a plurality of computing cores capable of computing large volumes of data in parallel. When the computers are used as virtual currency mining machines, mining algorithms run in parallel in the plurality of computing cores, and corresponding virtual currency can be obtained when computed results satisfy a certain specific requirement. The computers as virtual currency mining machines are expected to acquire more virtual currency in a shorter time. Power consumption of computers as virtual currency mining machines is equivalent to cost, so it is crucial to increase computing power (that is, to increase gain) and decrease a power consumption-computing power ratio (that is, cost consumed per unit of computing power), so as to improve performances of the virtual currency mining machines.

In order to achieve the highest computing power and the lowest power consumption-computing power ratio during computing by the computer having the plurality of computing cores, the plurality of computing cores operating in parallel are arranged in each chip to perform computing in parallel. It is expected that each computing core of the computer can achieve the highest computing power and the lowest power consumption ratio ideally. However, in consideration of the overall operating stability of the computer and occupied area and power consumption of a clock frequency unit such as a phase-locked loop (PLL) module or a frequency-locked loop (FLL) module for providing a clock frequency for each computing core, a clock frequency unit disposed in a chip is used to provide a clock frequency for all computing cores in the chip simultaneously, that is, each chip in the computer generally has only one clock frequency unit for providing a uniform clock frequency for all computing cores in the chip. In this case, in order to ensure that all the computing cores in the chip can normally operate, the clock frequency provided by the clock frequency unit of the chip is determined generally according to the clock frequency required by the computing core having the lowest computing power, resulting in that the remaining computing cores in the chip cannot achieve the highest computing power when operating at the determined lower clock frequency. If the computing power cannot satisfy the requirement, for purpose of improvement of computing power, an operating voltage of the chip is increased generally, thereby correspondingly increasing the power consumption, which leads to loss of computing power and increase of power consumption-computing power ratio of the computer.

SUMMARY

According to a first aspect of the present disclosure, there is provided a method for providing clock frequencies for computing cores, comprising: causing a main clock frequency unit to provide a first main clock frequency for a plurality of computing cores; testing the plurality of computing cores operating at the first main clock frequency, so as to determine whether a pass rate of the plurality of computing cores for normal operation at the first main clock frequency is greater than a first pass rate upper threshold or less than a first pass rate lower threshold; when the pass rate of the plurality of computing cores for normal operation at the first main clock frequency is less than the first pass rate lower threshold, causing an auxiliary clock frequency unit to provide a first auxiliary clock frequency lower than the first main clock frequency for computing cores abnormally operating at the first main clock frequency among the plurality of computing cores, and causing the main clock frequency unit to continue providing the first main clock frequency for the remaining computing cores among the plurality of computing cores; and when the pass rate of the plurality of computing cores for normal operation at the first main clock frequency is greater than the first pass rate upper threshold, causing the main clock frequency unit to provide a second main clock frequency higher than the first main clock frequency for the plurality of computing cores.

In some embodiments, the method further comprises: testing the plurality of computing cores operating at the second main clock frequency, so as to determine whether a pass rate of the plurality of computing cores for normal operation at the second main clock frequency is greater than the first pass rate upper threshold or less than the first pass rate lower threshold; when the pass rate of the plurality of computing cores for normal operation at the second main clock frequency is less than the first pass rate lower threshold, causing the auxiliary clock frequency unit to provide a second auxiliary clock frequency lower than the second main clock frequency for computing cores abnormally operating at the second main clock frequency among the plurality of computing cores, and causing the main clock frequency unit to continue providing the second main clock frequency for the remaining computing cores among the plurality of computing cores; and when the pass rate of the plurality of computing cores for normal operation at the second main clock frequency is greater than the first pass rate upper threshold, causing the main clock frequency unit to provide a third main clock frequency higher than the second main clock frequency for the plurality of computing cores.

In some embodiments, the method further comprises, after the causing an auxiliary clock frequency unit to provide a first auxiliary clock frequency lower than the first main clock frequency for computing cores abnormally operating at the first main clock frequency among the plurality of computing cores: testing the remaining computing cores operating at the first main clock frequency, so as to determine whether a pass rate of the remaining computing cores for normal operation at the first main clock frequency is greater than a second pass rate upper threshold or less than a second pass rate lower threshold; when the pass rate of the remaining computing cores for normal operation at the first main clock frequency is less than the second pass rate lower threshold, causing the main clock frequency unit to provide a fourth main clock frequency lower than the first main clock frequency and higher than the first auxiliary clock frequency for the remaining computing cores; and when the pass rate of the remaining computing cores for normal operation at the first main clock frequency is greater than the second pass rate upper threshold, causing the main clock frequency unit to provide the second main clock frequency higher than the first main clock frequency for the remaining computing cores.

In some embodiments, the method further comprises, after the causing the main clock frequency unit to provide a fourth main clock frequency lower than the first main clock frequency and higher than the first auxiliary clock frequency for the remaining computing cores, determining a final main clock frequency that the main clock frequency unit is to be configured to provide through a process comprising the following steps: a first step comprising testing all computing cores for which the main clock frequency unit provides a main clock frequency at a main clock frequency currently provided by the main clock frequency unit, so as to determine whether a pass rate of the computing cores for normal operation at the main clock frequency is greater than a third pass rate upper threshold or less than a third pass rate lower threshold, executing a second step if the pass rate is greater than the third pass rate upper threshold, executing a third step if the pass rate is less than the third pass rate lower threshold, and executing a fourth step if the pass rate is between the third pass rate upper threshold and the third pass rate lower threshold or if a total number of execution of the second step and the third step exceeds a first predetermined number threshold; the second step comprising increasing the main clock frequency provided by the main clock frequency unit within a range less than the first main clock frequency, and returning to the first step; the third step comprising decreasing the main clock frequency provided by the main clock frequency unit within a range greater than the first auxiliary clock frequency, and returning to the first step; and the fourth step comprising determining the main clock frequency currently provided by the main clock frequency unit as the final main clock frequency of the main clock frequency unit.

In some embodiments, when the pass rate of the remaining computing cores for normal operation at the first main clock frequency is between the second pass rate upper threshold and the second pass rate lower threshold, the first main clock frequency is determined as a clock frequency provided by the main clock frequency unit, the first auxiliary clock frequency is determined as a clock frequency provided by the auxiliary clock frequency unit, the computing cores for which the main clock frequency unit currently provides the clock frequency are determined as computing cores for which the main clock frequency unit finally provides the clock frequency, and the computing cores for which the auxiliary clock frequency unit currently provides the clock frequency are determined as computing cores for which the auxiliary clock frequency unit finally provides the clock frequency.

In some embodiments, the method further comprises: testing the remaining computing cores operating at the second main clock frequency, so as to determine whether a pass rate of the remaining computing cores for normal operation at the second main clock frequency is greater than the second pass rate upper threshold or less than the second pass rate lower threshold; when the pass rate of the remaining computing cores for normal operation at the second main clock frequency is less than the second pass rate lower threshold, causing the auxiliary clock frequency unit to provide a second auxiliary clock frequency lower than the second main clock frequency for computing cores abnormally operating at the second main clock frequency among the remaining computing cores; and when the pass rate of the remaining computing cores for normal operation at the second main clock frequency is greater than the second pass rate upper threshold, causing the main clock frequency unit to provide a third main clock frequency higher than the second main clock frequency for the remaining computing cores.

In some embodiments, when the pass rate of the remaining computing cores for normal operation at the second main clock frequency is between the second pass rate upper threshold and the second pass rate lower threshold, the second main clock frequency is determined as a clock frequency provided by the main clock frequency unit, the first auxiliary clock frequency is determined as a clock frequency provided by the auxiliary clock frequency unit, and the computing cores for which the main clock frequency unit currently provides the clock frequency are determined as computing cores for which the main clock frequency unit finally provides the clock frequency, and the computing cores for which the auxiliary clock frequency unit currently provides the clock frequency are determined as computing cores for which the auxiliary clock frequency unit finally provides the clock frequency.

In some embodiments, the second pass rate upper threshold is equal to or less than the first pass rate upper threshold, or the second pass rate lower threshold is equal to or less than the first pass rate lower threshold.

In some embodiments, the second auxiliary clock frequency is equal to the first auxiliary clock frequency, or the auxiliary clock frequency provided by the auxiliary clock frequency unit changes as a main clock frequency currently provided by the main clock frequency unit changes.

In some embodiments, the auxiliary clock frequency unit includes a plurality of auxiliary clock frequency units configured to provide a plurality of different auxiliary clock frequencies.

In some embodiments, the method further comprises, when the pass rate of the plurality of computing cores for normal operation at the first main clock frequency is less than the first pass rate lower threshold: configuring each of the plurality of auxiliary clock frequency units to provide a fixed auxiliary clock frequency lower than the first main clock frequency; or configuring the plurality of auxiliary clock frequency units to provide a plurality of auxiliary clock frequencies that are lower than the first main clock frequency and form an arithmetic progression along with the first main clock frequency; or configuring the plurality of auxiliary clock frequency units to provide a plurality of auxiliary clock frequencies that are lower than the first main clock frequency and form a geometric progression along with the first main clock frequency; or configuring each of the plurality of auxiliary clock frequency units to provide an initial auxiliary clock frequency lower than the first main clock frequency, and determining a final auxiliary clock frequency that the auxiliary clock frequency unit is to be configured to provide through a process comprising the following steps: a first step comprising testing all computing cores for which the auxiliary clock frequency unit provides an auxiliary clock frequency at an auxiliary clock frequency currently provided by the auxiliary clock frequency unit, so as to determine whether a pass rate of the computing cores for normal operation at the auxiliary clock frequency is greater than a fourth pass rate upper threshold or less than a fourth pass rate lower threshold, executing a second step if the pass rate is greater than the fourth pass rate upper threshold, executing a third step if the pass rate is less than the fourth pass rate lower threshold, and executing a fourth step if the pass rate is between the fourth pass rate upper threshold and the fourth pass rate lower threshold or if a total number of execution of the second step and the third step exceeds a second predetermined number threshold; the second step comprising increasing the auxiliary clock frequency provided by the auxiliary clock frequency unit, and returning to the first step; the third step comprising decreasing the auxiliary clock frequency provided by the auxiliary clock frequency unit, and returning to the first step; and the fourth step comprising determining the auxiliary clock frequency currently provided by the auxiliary clock frequency unit as the final auxiliary clock frequency of the auxiliary clock frequency unit.

In some embodiments, the auxiliary clock frequency units further comprise a backstop auxiliary clock frequency unit configured to provide a lowest clock frequency acceptable for a process of the computing cores, or configured to provide a clock frequency required by a computing core having a poorest computing power among the plurality of computing cores.

In some embodiments, when the pass rate of the plurality of computing cores for normal operation at the first main clock frequency is less than the first pass rate lower threshold, the computing cores abnormally operating at the first main clock frequency among the plurality of computing cores are switched to the plurality of auxiliary clock frequency units.

In some embodiments, the switching of the computing cores abnormally operating at the first main clock frequency among the plurality of computing cores to the plurality of auxiliary clock frequency units comprises: grade-by-grade switching the computing cores abnormally operating at the first main clock frequency among the plurality of computing cores to the plurality of auxiliary clock frequency units, the grade-by-grade switching comprising: grading the plurality of auxiliary clock frequency units in descending order of the auxiliary clock frequencies provided thereby; causing an auxiliary clock frequency unit at a highest grade providing a highest auxiliary clock frequency among the plurality of auxiliary clock frequency units to provide an auxiliary clock frequency for the computing cores abnormally operating at the first main clock frequency; and taking the auxiliary clock frequency unit at the highest grade as a current auxiliary clock frequency unit, and carrying out a grade-by-grade switching process on the current auxiliary clock frequency unit circularly as follows: testing all computing cores for which the current auxiliary clock frequency unit provides the auxiliary clock frequency, so as to determine whether there is a computing core abnormally operating; when there is a computing core abnormally operating, causing an auxiliary clock frequency unit at a lower grade next to a grade of the current auxiliary clock frequency unit to provide an auxiliary clock frequency for the computing core abnormally operating, causing the current auxiliary clock frequency unit to provide the auxiliary clock frequency for computing cores normally operating, and taking the auxiliary clock frequency unit at the lower grade next to the grade of the current auxiliary clock frequency unit as an updated current auxiliary clock frequency unit; and when there are no computing core abnormally operating or there are no auxiliary clock frequency unit at a lower grade next to a grade of the current auxiliary clock frequency unit, ending the grade-by-grade switching process.

In some embodiments, the method further comprises: when external conditions change, testing operating conditions of computing cores for which each of the plurality of auxiliary clock frequency units provides a clock frequency; when a time period in which a computing core for which the auxiliary clock frequency unit provides the clock frequency keep normally operating exceeds a predetermined threshold time period, switching the computing core to a clock frequency unit that provides a clock frequency higher than the clock frequency provided by the auxiliary clock frequency unit among the plurality of auxiliary clock frequency units and the main clock frequency unit.

In some embodiments, the method is carried out when a chip comprising the plurality of computing cores is initialized.

In some embodiments, when the pass rate of the plurality of computing cores for normal operation at the first main clock frequency is greater than the first pass rate upper threshold, the auxiliary clock frequency unit is caused to provide the first auxiliary clock frequency lower than the first main clock frequency for computing cores abnormally operating at the first main clock frequency among the plurality of computing cores, and the main clock frequency unit is caused to provide the second main clock frequency higher than the first main clock frequency for the remaining computing cores among the plurality of computing cores.

In some embodiments, the method further comprises: setting a plurality of clock frequency ranges and setting a corresponding clock frequency adjustment step size for each of the plurality of clock frequency ranges, wherein a difference between the first main clock frequency and the second main clock frequency is a clock frequency adjustment step size corresponding to a clock frequency range within which the first main clock frequency falls among the plurality of clock frequency ranges.

According to a second aspect of the present disclosure, these is provided a chip, comprising a plurality of computing cores, and a main clock frequency unit and an auxiliary clock frequency unit for providing clock frequencies for the plurality of computing cores, wherein computing cores for which the main clock frequency unit provides a clock frequency among the plurality of computing cores, the clock frequency provided by the main clock frequency unit, computing cores for which the auxiliary clock frequency unit provides a clock frequency among the plurality of computing cores and the clock frequency provided by the auxiliary clock frequency unit are determined through the method according to any embodiment of the first aspect of the present disclosure.

According to a third aspect of the present disclosure, there is provided a data processing device comprising one or more chips according to any embodiment of the second aspect of the present disclosure.

In some embodiments, the data processing device is a virtual currency mining machine.

According to a fourth aspect of the present disclosure, there is provided a method for improving computing power and decreasing a power consumption-computing power ratio for a computer having a plurality of computing cores, comprising: providing a main clock frequency unit and at least one auxiliary clock frequency unit in each chip of the computer having the plurality of computing cores; and determining, via a test, a clock frequency of the main clock frequency unit, computing cores for which the main clock frequency unit provides the clock frequency in the chip, and computing cores for which the auxiliary clock frequency unit provides a clock frequency in the chip, so as to satisfy that a pass rate of the computing cores in the chip for normal operation is greater than or equal to a set pass rate threshold; the test is carried out when the computer having the plurality of computing cores is initialized.

In some embodiments, the determining, via a test, a clock frequency of the main clock frequency unit, computing cores for which the main clock frequency unit provides the clock frequency in the chip, and computing cores for which the auxiliary clock frequency unit provides a clock frequency in the chip comprises: executing the method according to any embodiment of the first aspect of the present disclosure.

According to a fifth aspect of the present disclosure, there is provided a system for improving computing power and decreasing a power consumption-computing power ratio for a virtual currency mining machine, the system comprising at least one chip of a computer having a plurality of computing cores, wherein each chip comprises: a main clock frequency unit, an auxiliary clock frequency unit and a plurality of computing cores, wherein, the main clock frequency unit is used for providing a clock frequency for a portion of the computing cores in the chip; the auxiliary clock frequency unit is used for providing a clock frequency for another portion of the computing cores in the chip; the clock frequency of the main clock frequency unit, computing cores for which the main clock frequency unit provides the clock frequency in the chip, and computing cores for which the auxiliary clock frequency unit provides the clock frequency in the chip are determined via a test, so as to satisfy that a pass rate of the computing cores in the chip for normal operation is greater than or equal to a set pass rate threshold; the test is carried out when the computer having the plurality of computing cores is initialized.

In some embodiments, determining, via a test, the clock frequency of the main clock frequency unit, computing cores for which the main clock frequency unit provides the clock frequency in the chip, and computing cores for which the auxiliary clock frequency unit provides the clock frequency in the chip comprises: executing the method according to any embodiment of the first aspect of the present disclosure.

According to a sixth aspect of the present disclosure, there is provided a computing apparatus, comprising: one or more processors; and a memory storing computer-executable instructions which, when executed by the one or more processors, cause the one or more processors to execute the method according to any embodiment of the first aspect of the present disclosure.

According to a seventh aspect of the present disclosure, there is provided a non-transitory storage medium having computer-executable instructions stored thereon which, when executed by a computer, cause the computer to execute the method according to any embodiment of the first aspect of the present disclosure.

DETAILED DESCRIPTION

Figure 1:
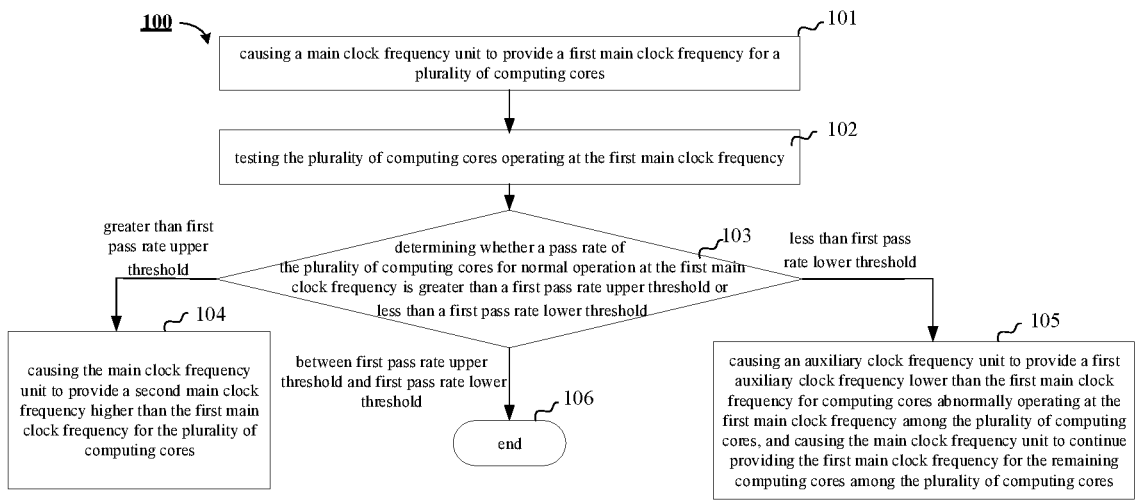
FIGS. 1-4 are flow diagrams illustrating a method for providing clock frequencies for computing cores according to some embodiments of the present disclosure.

In order to make the objectives, technical solutions and advantages of the present disclosure clearer, the present disclosure will be described in further detail below in conjunction with the accompanying drawings and embodiments. It should be noted that, unless specifically stated otherwise, relative arrangements, numerical expressions and values of the components and steps stated in these embodiments do not limit the scope of the present disclosure. The following description of at least one exemplary embodiment is merely illustrative in nature and in no way serves as any limitation of the present disclosure and its application or uses. Those skilled in the art will understand that they are merely illustrative of exemplary ways in which the present disclosure may be implemented, and are not exhaustive. Technique, methods and devices known to those of ordinary skill in the related art may not be discussed in detail, but should be considered as part of the authorized description where appropriate.

A clock frequency unit is usually disposed in a chip (also referred to as a computing chip) having a plurality of computing cores to provide a uniform clock frequency (also simply referred to as frequency herein) for all computing cores of the chip such that these computing cores can carry out parallel computing. However, due to factors such as process variations in a production process, different computing cores included in the same chip may have different performances, such that from the perspective of a single computing core, a computing core having a better performance can operate at a higher clock frequency, while a computing core having a poorer performance can only operate at a lower clock frequency. Therefore, when one clock frequency unit is disposed in the same chip to provide a uniform clock frequency for all the computing cores in the chip, the clock frequency provided by the clock frequency unit is often determined by the computing core having the worst performance in the chip such that many computing cores having better performances may not operate at the highest clock frequency applicable thereto, thereby resulting in the loss of computing power. Moreover, in this case, in order to improve the computing power, an operating voltage of the chip may have to be increased, which means an increase in power consumption. Thus, such a chip usually has low computing power and a high power consumption-computing power ratio, which is undesirable.

In view of this, in the present disclosure, firstly, for the case that a single clock frequency unit provides a clock frequency for a plurality of computing cores, the clock frequency that should be provided by the clock frequency unit may be searched by the following frequency searching method:

step 1: set a current frequency of the clock frequency unit, and test all computing cores for which the clock frequency unit provides clock frequencies at the current frequency, so as to determine whether a pass rate of the computing cores for normal operation at the current frequency is greater than a pass rate upper threshold or less than a pass rate lower threshold; if the pass rate is greater than the pass rate upper threshold (which usually indicates that most of the computing cores may normally work and it is likely to further increase the frequency for many computing cores), execute the following step 2; if the pass rate is less than the pass rate lower threshold (which usually indicates that some computing cores fail to work normally), execute the following step 3; and if all the computing cores are in a relatively critical desirable operating state (for example, if the pass rate is between the pass rate upper threshold and the pass rate lower threshold (it should be noted that a range "between A and B" described herein may include A and B), or if the total number of executing frequency adjustment (that is, executing the step 2 and the step 3) exceeds a predetermined number threshold), execute the following step 4;

step 2: increase the current frequency provided by the clock frequency unit (generally, progressively increase the frequency by a fixed value, or according to specific frequency adjustment conditions, such as but not limited to increase the frequency by a value increasingly decreasing with the approach of the critical condition), and return to the step 1;

step 3: decrease the current frequency provided by the clock frequency unit (generally, progressively decrease the frequency by a fixed value (the decreased value may be different from or the same as the increased value in the step 2), or according to specific frequency adjustment conditions, such as but not limited to decrease the frequency by a value increasingly decreasing with the approach of a critical condition), and return to the step 1; and step 4: determine the clock frequency currently provided by the clock frequency unit as a clock frequency that should be provided by the clock frequency unit.

For example, the test in the step 1 may be referred to as a computing power test. When N (N is a positive integer) computing cores operate at a clock frequency f, total theoretical computing power may be expressed as N x f. Then, an actual computing power test may be carried out on the N computing cores. When the computing power test is carried out on a computing core, a test vector (also referred to as a test stimulus herein) may be sent to the computing core. After receiving the test vector or test stimulus, the computing core carries out computing on the basis of the test vector and feeds back a computing result (that is, test stimulus response). If n (n is a natural number not greater than N) computing cores of the N computing cores feed back correct computing results, total actual computing power at the clock frequency f may be n x f. Therefore, the pass rate of the computing cores for normal operation at the frequency may be expressed as a ratio (n/N) of the total actual computing power to the total theoretical computing power at the frequency, which refers to a proportion of the number of computing cores normally operating at the current clock frequency to the total number of computing cores (referred to as "good core ratio" herein), and this parameter comprehensively takes into account all the computing cores served by the clock frequency unit.

The pass rate upper threshold and the pass rate lower threshold may be specifically set according to actual conditions (the number of computing cores served by the clock frequency unit, requirements of expected applications, stability of a system, etc.), and the pass rate lower threshold may be less than or equal to the pass rate upper threshold. As a non-limiting example, the pass rate upper threshold may be, for example, 99%, and the pass rate lower threshold may be, for example, 99%, 98%, 97%, etc. The frequency adjustment step size in the step 2 or the step 3 may be specifically set according to actual conditions, for example, may be 50 MHz, 30 MHz, 20 MHz, 15 MHz, 10 MHz, 5 MHz, etc.

In the above frequency searching method for the single clock frequency unit, all the computing cores served by the single clock frequency unit may be comprehensively taken into account to determine an appropriate operating frequency of these computing cores. Compared with using the clock frequency required by the computing core having the worst performance, a frequency determined in this way may realize relatively higher overall computing power.

However, the inventors of the present application have noticed that, in the above frequency searching method for the single clock frequency unit, there is still a problem that the computing cores having excellent performances sacrifice computing power, while the computing cores having poor performances may still fail to normally operate, resulting in direct and complete loss of their computing power. Therefore, the inventors of the present application conceive that a plurality of clock frequency units may be provided in a chip, and different clock frequency units provide clock frequencies for computing cores having different performances respectively, such that the computing cores having different performances may normally operate at respective appropriate clock frequencies, so as to develop greater computing power potential.

Therefore, a first aspect of the present disclosure provides a method for providing clock frequencies for computing cores, which may improve the overall computing power of a chip including the computing cores and realize a decreased power consumption-computing power ratio. The method for providing clock frequencies for computing cores according to some embodiments of the present disclosure will be described in detail below in combination with the accompanying drawings.

FIG. 1 shows a flow diagram of a method 100 for providing clock frequencies for computing cores according to some embodiments of the present disclosure. A plurality of clock frequency units may be provided in a chip, and the plurality of clock frequency units may include a main clock frequency unit and an auxiliary clock frequency unit(s). For example, the performance of each of the plurality of clock frequency units included in the chip may be tested first (for example, a jitter amount of a clock signal provided by a clock frequency unit, an accuracy of a clock frequency, etc. may be taken into account), and then the clock frequency unit having the better or best performance may be taken as a main clock frequency unit (which may provide clock frequencies for most computing cores) of the chip, and the remaining clock frequency unit(s) may be taken as auxiliary clock frequency unit(s). The main clock frequency unit and the auxiliary clock frequency unit(s) may be any components suitable for being arranged in a chip so as to be used for providing clock frequencies for computing cores, such as but not limited to a phase-locked loop (PLL) module or a frequency-locked loop (FLL) module, etc.

As shown in FIG. 1, the method 100 may include: at step 101, cause a main clock frequency unit to provide a first main clock frequency for a plurality of computing cores; at step 102, test the plurality of computing cores operating at the first main clock frequency; at step 103, determine whether a pass rate of the plurality of computing cores for normal operation at the first main clock frequency is greater than a first pass rate upper threshold or less than a first pass rate lower threshold. When the pass rate of the plurality of computing cores for normal operation at the first main clock frequency is less than the first pass rate lower threshold, the method 100 may proceed to step 105. In the step 105, an auxiliary clock frequency unit is caused to provide a first auxiliary clock frequency lower than the first main clock frequency for computing cores abnormally operating at the first main clock frequency among the plurality of computing cores, and the main clock frequency unit is caused to continue providing the first main clock frequency for the remaining computing cores among the plurality of computing cores. When the pass rate of the plurality of computing cores for normal operation at the first main clock frequency is greater than the first pass rate upper threshold, the method 100 may proceed to step 104. In the step 104, the main clock frequency unit is caused to provide a second main clock frequency higher than the first main clock frequency for the plurality of computing cores. Moreover, when the pass rate of the plurality of computing cores for normal operation at the first main clock frequency is between the first pass rate upper threshold and the first pass rate lower threshold, it is indicated that the current settings of the chip has satisfied expected computing power requirements as a whole, and therefore the method 100 may proceed to step 106 to be ended. At this point, a corresponding relation between each clock frequency unit and computing cores and the clock frequency provided by each clock frequency unit are determined to be used as final settings of the chip.

In some embodiments, when the pass rate of the plurality of computing cores for normal operation at the first main clock frequency is greater than the first pass rate upper threshold, the following operations may be carried out as an alternative at step 104: cause an auxiliary clock frequency unit to provide a first auxiliary clock frequency lower than the first main clock frequency for computing cores abnormally operating at the first main clock frequency among the plurality of computing cores, and cause the main clock frequency unit to provide a second main clock frequency higher than the first main clock frequency for the remaining computing cores among the plurality of computing cores. In such a case, even if the pass rate of the plurality of computing cores for normal operation at the first main clock frequency is greater than the first pass rate upper threshold, if the pass rate is not 100% (the pass rate of 100% means that all of the plurality of computing cores normally operate at the first main clock frequency), being independent of a process for increasing a frequency provided by the main clock frequency unit, the following process may also be realized that some or all of computing cores abnormally operating at the first main clock frequency among the plurality of computing cores may also be switched to the auxiliary clock frequency unit such that the computing cores remained on the main clock frequency unit may have more space for increasing a frequency as a whole. It should be understood that a process for switching computing cores from a main clock frequency unit to an auxiliary clock frequency unit and a process for increasing a frequency provided by a main clock frequency unit may be independent of each other and do not conflict with each other.

It could be understood that, although the condition that the pass rate is equal to the first pass rate upper threshold or the first pass rate lower threshold is assigned to the step 106 herein, in some embodiments, the condition that the pass rate is equal to the first pass rate upper threshold may be assigned to the step 104, or the condition that the pass rate is equal to the first pass rate lower threshold may be assigned to the step 105. This is not particularly limited in the present disclosure, and such description is also applicable to other similar places herein. In some embodiments, the first pass rate lower threshold may be equal to the first pass rate upper threshold. In such a case, the pass rate upper threshold and the pass rate lower threshold may be collectively referred to as pass rate threshold. Thus, in some examples, a frequency may be increased when the pass rate is greater than or equal to (or greater than) the pass rate threshold (and in some examples, switching to auxiliary clock frequency unit (if there is a computing core abnormally operating) is additionally carried out); and switching to auxiliary clock frequency unit is carried out when the pass rate is less than (or less than or equal to) the pass rate threshold. Alternatively, in another some examples, a frequency may be increased when the pass rate is greater than the pass rate threshold (and in some examples, switching to auxiliary clock frequency unit (if there is a computing core abnormally operating)) is additionally carried out); switching to auxiliary clock frequency unit is carried out when the pass rate is less than the pass rate threshold; and adjustment is completed when the pass rate is equal to the pass rate threshold.

It should be understood that the terms "main clock frequency" and "auxiliary clock frequency" are both clock frequencies, and are merely intended to distinguish the clock frequency provided by the main clock frequency unit from the clock frequency provided by the auxiliary clock frequency unit. In addition, the terms "test" and "pass rate" have the same meanings as those of "test" and "pass rate" described above and will not be repeated herein.

In the method 100, all of the plurality of computing cores in the chip may be distributed to the main clock frequency unit and the main clock frequency unit may provide an initial main clock frequency for the computing cores, and then a decision may be made according to a test pass rate of the computing cores at the initial main clock frequency. If the pass rate is higher than the upper threshold, it is indicated that the computing cores served by the main clock frequency unit have a space for improving computing power as a whole, and thus the frequency provided by the main clock frequency unit may be increased (and in some examples, switching to the auxiliary clock frequency unit may be additionally carried out (if there is a computing core abnormally operating)). If the pass rate is lower than the lower threshold, it is indicated that some computing cores may already fail to normally operate. At this point, a portion of computing cores abnormally operating may be switched to the auxiliary clock frequency unit, so as to be prevented from imposing burdens on the remaining computing cores still normally operating. If the pass rate is between the upper threshold and the lower threshold, it is indicated that the present settings have satisfied expectations.

Figure 2:
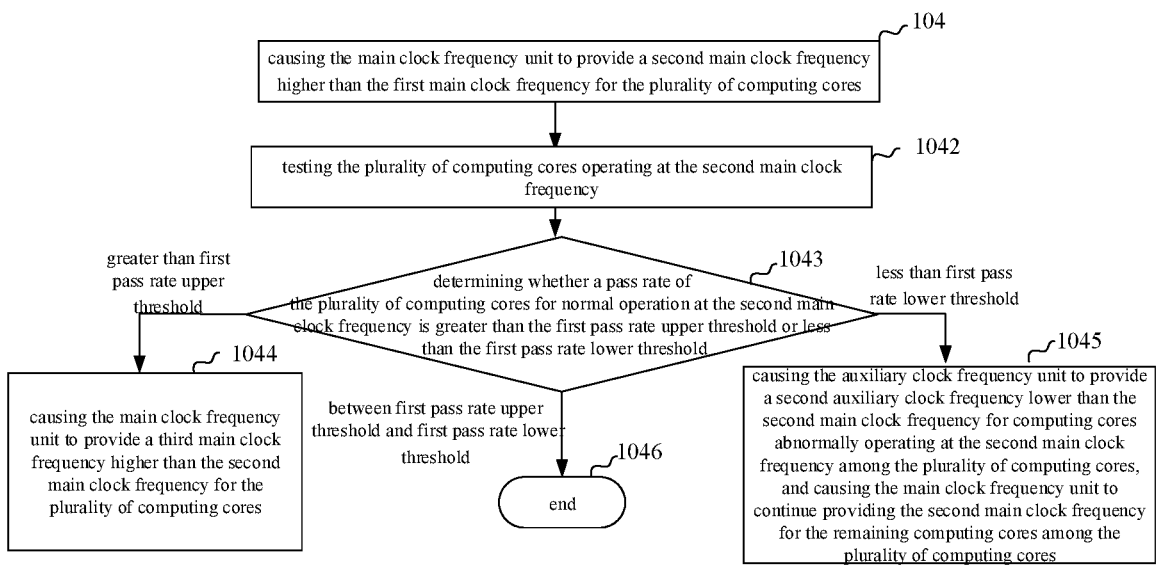

In some embodiments, the method 100 may further include steps shown in FIG. 2. FIG. 2 illustrates operations after the step 104 of the method 100. In the step 104, since in the step 103 it is found that the pass rate of the computing cores for normal operation at the first main clock frequency is greater than the first pass rate upper threshold and the main clock frequency unit is caused to provide a second main clock frequency higher than the first main clock frequency for the computing cores, as shown in FIG. 2, after the frequency provided by the main clock frequency unit is increased, the plurality of computing cores operating at the second main clock frequency may be tested at step 1042, and then whether the pass rate of the plurality of computing cores for normal operation at the second main clock frequency is greater than the first pass rate upper threshold or less than the first pass rate lower threshold is determined at step 1043. When the pass rate of the plurality of computing cores for normal operation at the second main clock frequency is less than the first pass rate lower threshold, an auxiliary clock frequency unit may be caused to provide a second auxiliary clock frequency lower than the second main clock frequency for computing cores abnormally operating at the second main clock frequency among the plurality of computing cores and the main clock frequency unit may be caused to continue providing the second main clock frequency for the remaining computing cores among the plurality of computing cores at step 1045. When the pass rate of the plurality of computing cores for normal operation at the second main clock frequency is greater than the first pass rate upper threshold, the main clock frequency unit may be caused to provide a third main clock frequency higher than the second main clock frequency for the plurality of computing cores (that is to continue to increase the frequency provided by the main clock frequency unit) at step 1044. In addition, when the pass rate of the plurality of computing cores for normal operation at the second main clock frequency is between the first pass rate upper threshold and the first pass rate lower threshold, it is indicated that current settings of the chip have satisfied computing power requirements as a whole, and therefore the method may proceed to step 1046 to be ended. At this point, a corresponding relation between each clock frequency unit and computing cores and the clock frequency provided by each clock frequency unit are determined to be used as final settings of the chip.

In some embodiments, when the pass rate of the plurality of computing cores for normal operation at the second main clock frequency is greater than the first pass rate upper threshold, the following operations may be carried out as an alternative at step 1044: cause an auxiliary clock frequency unit to provide a second auxiliary clock frequency lower than the second main clock frequency for computing cores abnormally operating at the second main clock frequency among the plurality of computing cores, and cause the main clock frequency unit to provide a third main clock frequency higher than the second main clock frequency for the remaining computing cores among the plurality of computing cores.

In some embodiments, the frequency provided by the main clock frequency unit may be progressively increased by a fixed frequency difference, that is, there may be a fixed frequency difference between the first main clock frequency and the second main clock frequency and between the second main clock frequency and the third main clock frequency. The fixed frequency difference may be specifically set according to actual conditions, for example, as 50 MHz, 30 MHz, 20 MHz, 15 MHz, 10 MHz, 5 MHz, etc.

In some embodiments, a plurality of clock frequency ranges may further be set and a corresponding clock frequency adjustment step size may be set for each of the plurality of clock frequency ranges. In some examples, these clock frequency ranges may be non-overlapping but contiguous (for example, a first clock frequency range is [0, f1), a second clock frequency range is [$f_1$, $f_2$), a third clock frequency range is [$f_2$, $f_3$), ..., an ith clock frequency range is [$f_{i-1}$, $f_i$), ..., etc., where $f_i > f_{i-1} > ... > f_3 > f_2 > f_1 > 0$). In some examples, higher clock frequency ranges may have smaller clock frequency adjustment step sizes (for example, a clock frequency adjustment step size for the first clock frequency range [0, $f_1$) is $\Delta f_1$, a clock frequency adjustment step size for the second clock frequency range [$f_1$, $f_2$) is $\Delta f_1$, a clock frequency adjustment step size for the third clock frequency range [$f_2$, $f_3$) is $\Delta f_3$, ..., a clock frequency adjustment step size for the ith clock frequency range [$f_{i-1}$, $f_i$) is $\Delta f_i$, ..., etc., where $\Delta f_i < ... < \Delta f_3 < \Delta f_2 < \Delta f_1$). Therefore, for the method 100, a difference between the first main clock frequency and the second main clock frequency may be a clock frequency adjustment step size corresponding to a clock frequency range within which the first main clock frequency falls among the plurality of clock frequency ranges, and a difference between the second main clock frequency and the third main clock frequency may be a clock frequency adjustment step size corresponding to a clock frequency range within which the second main clock frequency falls among the plurality of clock frequency ranges. In some examples, the difference between the first main clock frequency and the second main clock frequency may be greater than the difference between the second main clock frequency and the third main clock frequency. Thus, in a dynamic frequency adjustment process, frequency adjustment accuracy may be controlled according to a current clock frequency, so as to determine a clock frequency of a clock frequency unit as accurately and efficiently as possible.

In some embodiments, a plurality of thresholds for number of frequency increase and a plurality of progressively increased values for frequency increase may be further set, for example, a first progressively increased value for frequency increase may be set in the case of not exceeding the first threshold for number of frequency increase, a second progressively increased value for frequency increase less than the first progressively increased value for frequency increase may be set in the case of exceeding the first threshold for number of frequency increase but not exceeding a second threshold for number of frequency increase greater than the first threshold for number of frequency increase, and so on. This is because in a process for frequency increase, a limit of a chip will be increasingly approached, such that coarse frequency increase may be gradually transitioned into fine frequency increase, so as to accurately determine the clock frequency of the main clock frequency unit as much as possible.

In some embodiments, the second auxiliary clock frequency may be equal to the first auxiliary clock frequency. In some other embodiments, the auxiliary clock frequency provided by the auxiliary clock frequency unit changes as a main clock frequency currently provided by the main clock frequency unit changes. For example, the auxiliary clock frequency provided by the auxiliary clock frequency unit may always differ from the main clock frequency provided by the main clock frequency unit by a predetermined percentage (for example, 10%, 7%, 5%, 3%, 2%, 1%, etc.), or the auxiliary clock frequency provided by the auxiliary clock frequency unit may always differ from the main clock frequency provided by the main clock frequency unit by a predetermined difference (for example, 100 MHz, 50 MHz, 30 MHz, 20 MHz, 15 MHz, 10 MHz, 5 MHz, etc.). For example, when it is found in the step 103 that the pass rate of the plurality of computing cores for normal operation at the first main clock frequency is less than the first pass rate lower threshold, assuming for the moment that the first main clock frequency is 600 MHz, abnormally operating computing cores may be switched to the auxiliary clock frequency unit and the auxiliary clock frequency unit may be caused to provide a first auxiliary clock frequency of 580 MHz (differing from the first main clock frequency by 20 MHz). When it is found in the step 103 that the pass rate of the plurality of computing cores for normal operation at the first main clock frequency is greater than the first pass rate upper threshold but it is found in the step 1043 that the pass rate of the plurality of computing cores for normal operation at the second main clock frequency is less than the first pass rate lower threshold, assuming for the moment that the second main clock frequency is 650 MHz, abnormally operating computing cores may be switched to the auxiliary clock frequency unit and the auxiliary clock frequency unit may be caused to provide a second auxiliary clock frequency of 630 MHz (differing from the second main clock frequency by 20 MHz). In some embodiments, when no computing core is distributed to the auxiliary clock frequency unit, the auxiliary clock frequency unit may not be powered on so as to save power consumption.

It can be understood that after the step 1044, the process shown in FIG. 2 may be repeatedly applied. When a pass rate of these computing cores for normal operation at the increased frequency provided by the main clock frequency unit may be still higher than the pass rate upper threshold, the frequency provided by the main clock frequency unit may be continued to be increased (and in some examples, switching to the auxiliary clock frequency unit may be additionally carried out (if there is a computing core abnormally operating)). Once in a subsequent process for increasing a frequency provided by the main clock frequency unit, it is found that the pass rate of these computing cores for normal operation may not be higher than the pass rate upper threshold, computing cores that may not normally operate may be switched to the auxiliary clock frequency unit when the pass rate is lower than the pass rate lower threshold, such as the step 105 and the step 1045, or the method may be ended when the pass rate is between the pass rate upper threshold and the pass rate lower threshold.

Figure 3:
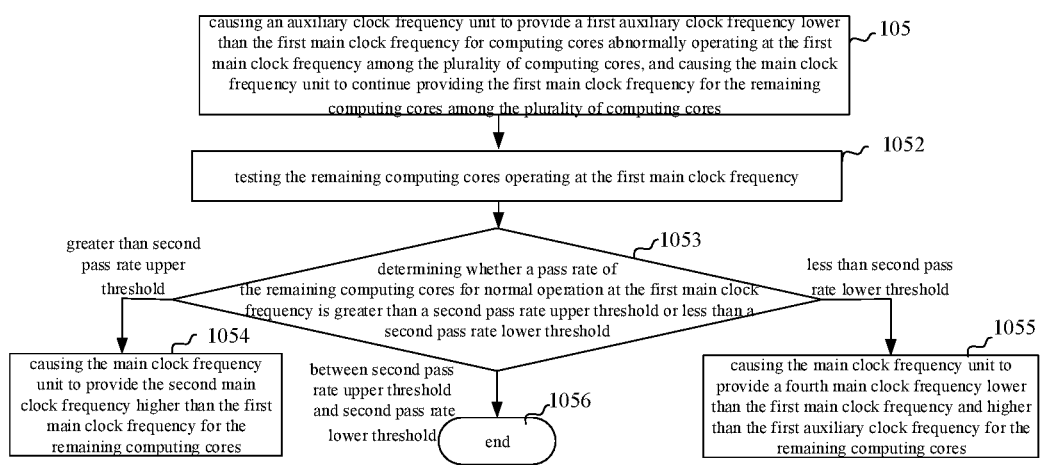

In some embodiments, the method 100 may further include steps shown in FIG. 3. FIG. 3 illustrates operations after the step 105 of the method 100. In the step 105, since it is found in the step 103 that the pass rate of the computing cores for normal operation at the first main clock frequency is less than the first pass rate lower threshold, the auxiliary clock frequency unit is caused to provide the first auxiliary clock frequency lower than the first main clock frequency to computing cores abnormally operating at the first main clock frequency among the plurality of computing cores and the main clock frequency unit is caused to continue providing the first main clock frequency to the remaining computing cores among the plurality of computing cores, as shown in FIG. 3, after the computing cores abnormally operating are switched to the auxiliary clock frequency unit, the remaining computing cores operating at the first main clock frequency may be tested at step 1052, and it is determined whether the pass rate of the remaining computing cores for normal operation at the first main clock frequency is greater than a second pass rate upper threshold or less than a second pass rate lower threshold at step 1053. When the pass rate of the remaining computing cores for normal operation at the first main clock frequency is less than the second pass rate lower threshold, at step 1055, the main clock frequency unit may be caused to provide a fourth main clock frequency lower than the first main clock frequency and higher than the first auxiliary clock frequency for the remaining computing cores (that is, the frequency provided by the main clock frequency unit may be decreased). When the pass rate of the remaining computing cores for normal operation at the first main clock frequency is greater than the second pass rate upper threshold, at step 1054, the main clock frequency unit may be caused to provide a second main clock frequency higher than the first main clock frequency for the remaining computing cores (that is, the frequency provided by the main clock frequency unit may keep being increased). In addition, when the pass rate of the remaining computing cores for normal operation at the first main clock frequency is between the second pass rate upper threshold and the second pass rate lower threshold, it is indicated that the current settings of the chip have satisfied computing power requirements as a whole, and therefore the method may proceed to step 1056 to be ended. At this point, a corresponding relation between each clock frequency unit and computing cores and the clock frequency provided by each clock frequency unit are determined to be used as final settings of the chip, that is, the first main clock frequency may be determined as a clock frequency provided by the main clock frequency unit, the first auxiliary clock frequency is determined as a clock frequency provided by the auxiliary clock frequency unit, and computing cores for which the main clock frequency unit currently provides clock frequencies are determined as computing cores for which the main clock frequency unit finally provides the clock frequencies, and computing cores for which the auxiliary clock frequency unit currently provides clock frequencies are determined as computing cores for which the auxiliary clock frequency unit finally provides the clock frequencies.

In some embodiments, when the pass rate of the remaining computing cores for normal operation at the first main clock frequency is greater than the second pass rate upper threshold, the following operations may be carried out as an alternative at step 1054: cause an auxiliary clock frequency unit to provide a first auxiliary clock frequency lower than the first main clock frequency for computing cores abnormally operating at the first main clock frequency among the plurality of computing cores, and cause the main clock frequency unit to provide a second main clock frequency higher than the first main clock frequency for the remaining computing cores among the plurality of computing cores. That is to say, if it is found that the pass rate of the remaining computing cores is greater than the pass rate upper threshold after a portion of the computing cores abnormally operating is switched to the auxiliary clock frequency unit, in addition to that the frequency provided by the main clock frequency unit may be increased, more computing cores abnormally operating (if there is any) may be additionally switched to the auxiliary clock frequency unit, so as to further expand the space for increasing a frequency of the computing cores remained on the main clock frequency unit.

A relative relation between the second pass rate upper threshold and the second pass rate lower threshold may be similar to a relative relation between the first pass rate upper threshold and the first pass rate lower threshold, which will not be repeated herein.

In some embodiments, the second pass rate upper threshold may be equal to or less than the first pass rate upper threshold. In some embodiments, the second pass rate lower threshold may be equal to or less than the first pass rate lower threshold. In some embodiments, the second pass rate upper threshold may be equal to or less than the first pass rate upper threshold, and the second pass rate lower threshold may be equal to or less than the first pass rate lower threshold. This is because the number of computing cores served by the main clock frequency unit is decreased In this case. It could be understood that if only 10 of 100 computing cores abnormally operate, the pass rate is 90%, but if 10 of 50 computing cores abnormally operate, the pass rate is only 80%. Therefore, at least one of the pass rate upper threshold and the pass rate lower threshold may be appropriately adjusted as the number of computing cores served by the main clock frequency unit changes.

If it is determined in step 1053 that the pass rate of the remaining computing cores for normal operation at the first main clock frequency is greater than the second pass rate upper threshold, it is indicated that the remaining computing cores still have computing power improvement room after the computing cores abnormally operating are removed, and thus the frequency provided by the main clock frequency unit may keep being increased (and in some examples, switching to the auxiliary clock frequency unit may be additionally carried out (if there is a computing core abnormally operating)). Operations after the step 1054 may be similar to those in FIG. 2. For example, the remaining computing cores operating at the second main clock frequency may be tested, so as to determine whether a pass rate of the remaining computing cores for normal operation at the second main clock frequency is greater than the second pass rate upper threshold or less than the second pass rate lower threshold. When the pass rate of the remaining computing cores for normal operation at the second main clock frequency is less than the second pass rate lower threshold, an auxiliary clock frequency unit may be caused to provide a second auxiliary clock frequency lower than the second main clock frequency for computing cores abnormally operating at the second main clock frequency among the remaining computing cores (similarly, the method in FIG. 3 may be continuously repeated thereafter). When the pass rate of the remaining computing cores for normal operation at the second main clock frequency is greater than the second pass rate upper threshold, the main clock frequency unit may be caused to provide a third main clock frequency higher than the second main clock frequency for the remaining computing cores (and in some examples, switching to the auxiliary clock frequency unit may be additionally carried out (if there is a computing core abnormally operating)) (similarly, the method in FIG. 2 may be continuously repeated thereafter). In addition, in some embodiments, when the pass rate of the remaining computing cores for normal operation at the second main clock frequency is between the second pass rate upper threshold and the second pass rate lower threshold, the second main clock frequency is determined as a clock frequency provided by the main clock frequency unit, the first auxiliary clock frequency is determined as a clock frequency provided by the auxiliary clock frequency unit, and computing cores for which the main clock frequency unit currently provides clock frequencies are determined as computing cores for which the main clock frequency unit finally provides the clock frequencies, and computing cores for which the auxiliary clock frequency unit currently provides clock frequencies are determined as computing cores for which the auxiliary clock frequency unit finally provides the clock frequencies.

If it is determined in the step 1053 that the pass rate of the remaining computing cores for normal operation at the first main clock frequency is still lower than the second pass rate lower threshold, it is indicated that even after some of the computing cores having poor performances are partially switched to the auxiliary clock frequency unit, the pass rate of the computing cores associated with the main clock frequency unit for normal operation is still not up to standard, and at this moment, the chip may almost reach its limit, or switching too many computing cores to the auxiliary clock frequency unit may adversely bring about the loss of computing power, thereby the frequency provided by the main clock frequency unit may be decreased. Generally, an amplitude for decreasing a frequency of the main clock frequency unit may be less than a difference between the frequency provided by the main clock frequency unit and the frequency provided by the auxiliary clock frequency unit. In some embodiments, after the main clock frequency unit is caused to provide a fourth main clock frequency lower than the first main clock frequency and higher than the first auxiliary clock frequency to the remaining computing cores in the step 1055, a final main clock frequency that the main clock frequency unit is to be configured to provide may be determined by a process including the following steps: a first step including testing all the computing cores for which the main clock frequency unit provides the main clock frequency at a main clock frequency currently provided by the main clock frequency unit, so as to determine whether a pass rate of the computing cores for normal operation at the main clock frequency is greater than a third pass rate upper threshold or less than a third pass rate lower threshold, executing a second step if the pass rate is greater than the third pass rate upper threshold, executing a third step if the pass rate is less than the third pass rate lower threshold, and executing a fourth step if the pass rate is between the third pass rate upper threshold and the third pass rate lower threshold; the second step including increasing the main clock frequency provided by the main clock frequency unit within a range less than the first main clock frequency, and returning to the first step; the third step including decreasing the main clock frequency provided by the main clock frequency unit within a range greater than the first auxiliary clock frequency, and returning to the first step; and the fourth step including determining the main clock frequency currently provided by the main clock frequency unit as the final main clock frequency provided by the main clock frequency unit. Additionally or alternatively, the process may further include: determining the number of frequency adjustment (the total number of execution of the second step and the third step), and executing the fourth step if the total number of execution of the second step and the third step exceeds a first predetermined number threshold. This is to trade off frequency adjustment efficiency and time consumption.

A relative relation between the third pass rate upper threshold and the third pass rate lower threshold may be similar to a relative relation between the first pass rate upper threshold and the first pass rate lower threshold, which will not be repeated herein.

Figure 4:
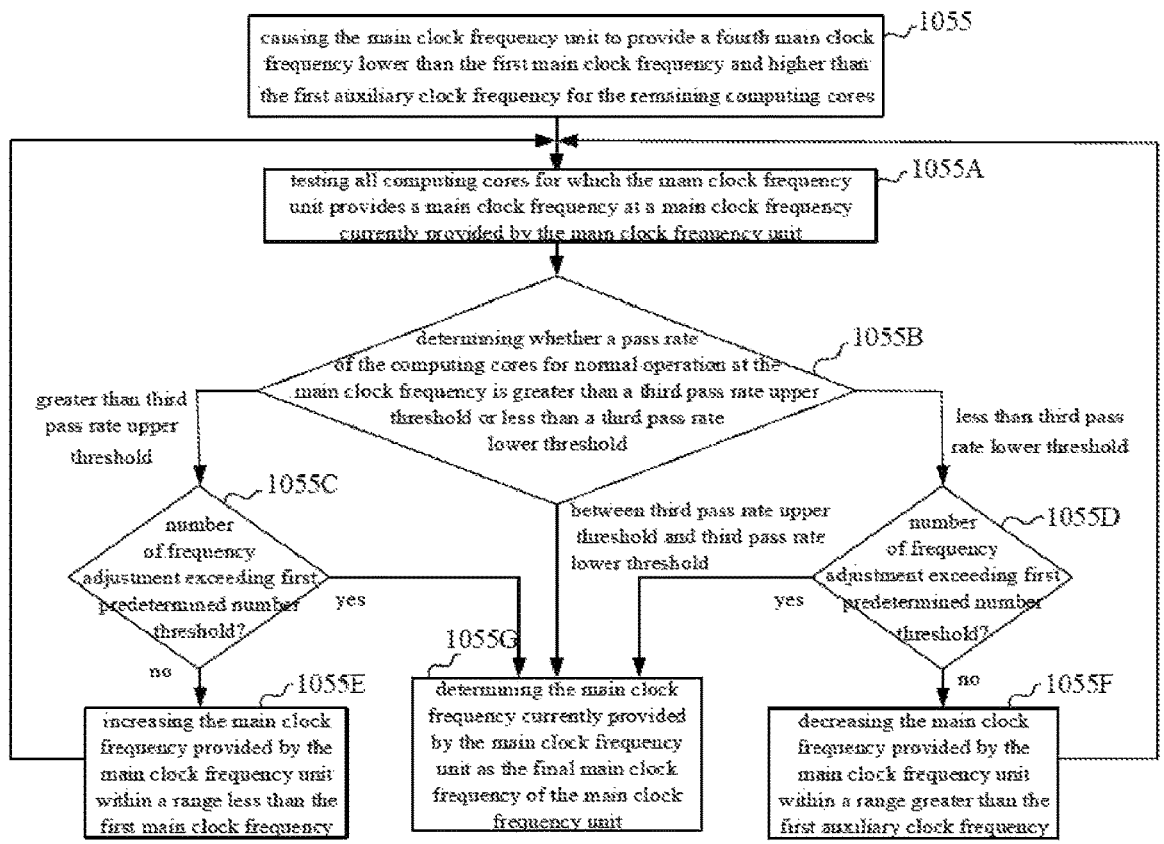

For example, the method 100 may further include steps shown in FIG. 4. FIG. 4 illustrates the operations after the step 1055, which may be similar to the above frequency searching method for the single clock frequency unit, but in this case, an object is the main clock frequency unit. That is to say, at this stage, the distribution of the computing cores is not further adjusted, and only a specific frequency of the main clock frequency unit is further adjusted. Specifically, in FIG. 4, at the step 1055, the main clock frequency unit is caused to provide the fourth main clock frequency lower than the first main clock frequency and higher than the first auxiliary clock frequency for the remaining computing cores. Then, at step 1055A, all the computing cores for which the main clock frequency unit provides the main clock frequency are tested at a main clock frequency currently provided by the main clock frequency unit. At step 1055B, whether a pass rate of the computing cores for normal operation at the main clock frequency is greater than a third pass rate upper threshold or less than a third pass rate lower threshold is determined. If the pass rate is greater than the third pass rate upper threshold, the method may proceed to step 1055C to determine whether the number of frequency adjustment exceeds a first predetermined number threshold, and if not, the method may proceed to step 1055E to increase the main clock frequency provided by the main clock frequency unit within a range less than the first main clock frequency (for example, a fixed frequency difference may be progressively increased), and then return to the step 1055A. If the pass rate is less than the third pass rate lower threshold, the method may proceed to step 1055D to determine whether the number of frequency adjustments exceeds the first predetermined number threshold, and if not, the method may proceed to step 1055F to decrease the main clock frequency provided by the main clock frequency unit within a range greater than the first auxiliary clock frequency (for example, a fixed frequency difference may be progressively decreased), and then return to the step 1055A. If it is determined in the step 1055B that the pass rate of the computing cores for normal operation at the main clock frequency is between the third pass rate upper threshold and the third pass rate lower threshold, or if it is determined in the step 1055C or step 1055D that the number of frequency adjustment exceeds the first predetermined number threshold, the method may proceed to step 1055G to determine the main clock frequency currently provided by the main clock frequency unit as a final main clock frequency provided by the main clock frequency unit.

In some embodiments, clock frequency adjustment step sizes (including a frequency decrease step size in step 1055F and a frequency increase step size in step 1055E) of the main clock frequency unit may be decreased along with increases of the number of frequency adjustment (including frequency increase and frequency decrease). In this way, a proper clock frequency provided by the main clock frequency unit may be gradually reached.

In some embodiments, the third pass rate upper threshold may be equal to the second pass rate upper threshold. In some embodiments, the third pass rate lower threshold may be equal to the second pass rate lower threshold.

For the above various conditions in which it is necessary to switch the computing cores that operate abnormally to the auxiliary clock frequency unit, in some embodiments, a computing core that operates abnormally may be found by the following method: send a test vector to the computing core once, and if a returned result is wrong, determine that the computing core operates abnormally. This is in consideration of the timeliness and responsiveness requirements of a switching process. Otherwise, a condition in which a frequency adjustment (frequency increase/decrease) may be carried out on the main clock frequency unit before which computing core is to be switched is determined may occur, which will affect the determination of the main clock frequency unit subjected to the frequency adjustment. In some other embodiments, different test vectors may also be sent to the computing core for a plurality of times, and if an error ratio of returned results exceeds a preset threshold ratio, it is indicated that the computing core operates abnormally. This is in consideration of the accuracy of a determination result. In some other embodiments, different test vectors may also be continuously sent to the computing core for a plurality of times, and if the number of continuously returned error results exceeds a preset threshold number (for example, results continuously returned for three times are all wrong), it is indicated that the computing core operates abnormally. This is also in consideration of the accuracy of a determination result.

In addition, for the above various conditions in which it is necessary to switch the computing cores that abnormally operate to the auxiliary clock frequency unit, some or all of the computing cores that abnormally operate may be switched to the auxiliary clock frequency unit. For example, a quantity ratio of computing cores that are switched to the auxiliary clock frequency unit to computing cores that abnormally operate may be at least 50%, or at least 60%, or at least 70%, or at least 80%, or 90%, or 100%. In some embodiments, in the FIG. 3, after it is determined in the step 1053 that the pass rate of the remaining computing cores for normal operation at the first main clock frequency is lower than the second pass rate lower threshold, and before frequency decrease is carried out on the main clock frequency unit in the step 1055, the following steps may be additionally included: determine whether a quantity ratio of the computing cores switched to the auxiliary clock frequency unit to the computing cores abnormally operating at the first main clock frequency reaches a preset threshold quantity ratio (which may be set according to specific requirements, for example, may be set as 100%, 95%, 90%, etc.); if yes, continue to carry out the frequency decrease on the main clock frequency unit in the step 1055; and if not, further switch more computing cores that abnormally operate at the first main clock frequency to the auxiliary clock frequency unit (for example, add a preset number of computing cores, or add a preset proportion (such as, 5%, 3%, 1%, etc. of the computing cores that abnormally operate at the first main clock frequency) of computing cores, or add switched computing cores in other manners), and then return to the step 105 in FIG. 3. It should be understood that a process for switching computing cores from the main clock frequency unit to an auxiliary clock frequency unit may be independent of a frequency increase/decrease process for the main clock frequency unit, and the two processes are not in conflict.

In some embodiments, the auxiliary clock frequency unit may include a plurality of auxiliary clock frequency units, the plurality of auxiliary clock frequency units being capable of being configured to provide a plurality of different auxiliary clock frequencies. In some embodiments, in consideration of occupied area, power consumption, etc. of the clock frequency units in the chip, the total number of the clock frequency units may be controlled. In some examples, the total number of clock frequency units may be controlled to be no more than 4, for example, there may be one main clock frequency unit and two to three auxiliary clock frequency units. Of course, setting more clock frequency units are also possible.

In the case where there is a plurality of auxiliary clock frequency units, take the step 105 in FIG. 1 as an example, when the pass rate of the plurality of computing cores for normal operation at the first main clock frequency is less than the first pass rate lower threshold: in some embodiments, each auxiliary clock frequency unit may be configured to provide a fixed auxiliary clock frequency (not changing as the main clock frequency changes) lower than the first main clock frequency; in some embodiments, the plurality of auxiliary clock frequency units may be configured to provide a plurality of auxiliary clock frequencies lower than the first main clock frequency, where the plurality of auxiliary clock frequencies form an arithmetic progression along with the first main clock frequency (for example, a tolerance of the arithmetic progression may be 50 MHz, 30 MHz, 20 MHz, 10 MHz, 5 MHz, etc.); in some embodiments, the plurality of auxiliary clock frequency units may be configured to provide a plurality of auxiliary clock frequencies lower than the first main clock frequency, where the plurality of auxiliary clock frequencies forms a geometric progression along with the first main clock frequency (for example, a common ratio of the geometric progression may be 10%, 7%, 5%, 3%, etc.); in some embodiments, each auxiliary clock frequency unit may be configured to provide an initial auxiliary clock frequency lower than the first main clock frequency, and then a frequency searching method similar to that of the above single clock frequency unit may be used to search a frequency for the auxiliary clock frequency as an object. For example, the frequency searching method for the auxiliary clock frequency unit may include a process including the following steps so as to determine a final auxiliary clock frequency that the auxiliary clock frequency unit is to be configured to provide: a first step including testing all the computing cores for which the auxiliary clock frequency unit provides the auxiliary clock frequency at an auxiliary clock frequency currently provided by the auxiliary clock frequency unit, so as to determine whether a pass rate of the computing cores for normal operation at the auxiliary clock frequency is greater than a fourth pass rate upper threshold or less than a fourth pass rate lower threshold, executing a second step if the pass rate is greater than the fourth pass rate upper threshold, executing a third step if the pass rate is less than the fourth pass rate lower threshold, and executing a fourth step if the pass rate is between the fourth pass rate upper threshold and the fourth pass rate lower threshold or if the total number of execution of the second step and the third step exceeds a second predetermined number threshold; a second step including increasing the auxiliary clock frequency provided by the auxiliary clock frequency unit (for example, progressively increasing the auxiliary clock frequency by a fixed frequency difference), and returning to the first step; a third step including decreasing the auxiliary clock frequency provided by the auxiliary clock frequency unit (for example, progressively decreasing the auxiliary clock frequency by a fixed frequency difference), and returning to the first step; and a fourth step including determining the auxiliary clock frequency currently provided by the auxiliary clock frequency unit as the final auxiliary clock frequency provided by the auxiliary clock frequency unit.

Figure 5:
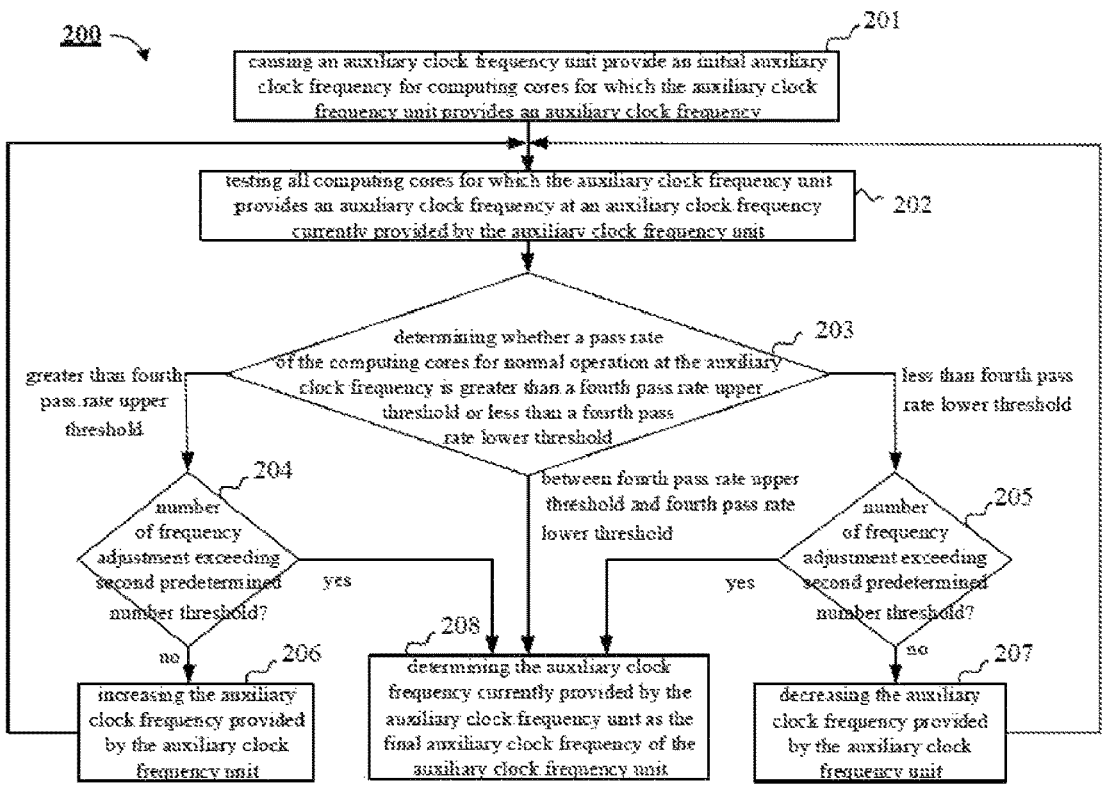
FIG. 5 is a flow diagram illustrating a method for determining an auxiliary clock frequency of an auxiliary clock frequency unit according to some embodiments of the present disclosure.

FIG. 5 illustrates an example frequency searching method 200 for an auxiliary clock frequency unit. At step 201, cause an auxiliary clock frequency unit to provide an initial auxiliary clock frequency for computing cores for which the auxiliary clock frequency unit provides the auxiliary clock frequency. Thereafter, at step 202, test all the computing cores for which the auxiliary clock frequency unit provides the auxiliary clock frequency at an auxiliary clock frequency currently provided by the auxiliary clock frequency unit. At step 203, determine whether a pass rate of the computing cores for normal operation at the auxiliary clock frequency is greater than a fourth pass rate upper threshold or less than a fourth pass rate lower threshold. If the pass rate is greater than the fourth pass rate upper threshold, the method may proceed to step 204 to determine whether the number of frequency adjustment exceeds a second predetermined number threshold. If not, the method may proceed to step 206 to increase the auxiliary clock frequency provided by the auxiliary clock frequency unit (for example, a fixed frequency difference may be progressively increased), and then return to the step 202. If the pass rate is less than the fourth pass rate lower threshold, the method may proceed to step 205 to determine whether the number of frequency adjustment exceeds the second predetermined number threshold. If not, the method may proceed to step 207 to decrease the auxiliary clock frequency provided by the auxiliary clock frequency unit (for example, a fixed frequency difference may be progressively decreased), and then return to the step 202. If it is determined in the step 203 that the pass rate of the computing cores for normal operation at the auxiliary clock frequency is between the fourth pass rate upper threshold and the fourth pass rate lower threshold, or if it is determined in the step 204 or step 205 that the number of frequency adjustment exceeds the second predetermined number threshold, the method may proceed to step 208 to determine the auxiliary clock frequency currently provided by the auxiliary clock frequency unit as the final auxiliary clock frequency provided by the auxiliary clock frequency unit. As previously described, the step 204 and the step 205 are optional.

In some embodiments, clock frequency adjustment step sizes (including a frequency decrease step size in step 207 and a frequency increase step size in step 206) of the auxiliary clock frequency unit may be decreased with increase of the number of frequency adjustment (including frequency increase and frequency decrease). In this way, a proper clock frequency provided by the auxiliary clock frequency unit may be gradually reached.

A relative relation between the fourth pass rate upper threshold and the fourth pass rate lower threshold may be similar to a relative relation between the first pass rate upper threshold and the first pass rate lower threshold, which will not be repeated herein.

It should be understood that the fourth pass rate upper threshold may be equal to or less than the above third pass rate upper threshold, and the fourth pass rate lower threshold may be equal to or less than the above third pass rate lower threshold. This is because as mentioned above, the number of computing cores distributed to the auxiliary clock frequency unit is often less than the number of computing cores distributed to the main clock frequency unit. In addition, the second predetermined number threshold may be the same as or different from the first predetermined number threshold for the main clock frequency unit, and may be determined according to specific conditions.

It should be noted that, in some embodiments, under the condition that the plurality of auxiliary clock frequencies forms an arithmetic progression or a geometric progression along with the first main clock frequency, the plurality of auxiliary clock frequencies may change as the main clock frequency changes. For example, in the step 105, the first main clock frequency provided by the main clock frequency unit is 600 MHz, and the plurality of auxiliary clock frequencies provided by the plurality of auxiliary clock frequency units may be 580 MHz, 560 MHz, 540 MHz, . . . (with a tolerance of 20 MHz), or may be 570 MHz, 542 MHz, 514 MHz, . . . (with a common ratio of 5%). When proceeding to the step 1045, the second main clock frequency provided by the main clock frequency unit is 650 MHz, and the plurality of auxiliary clock frequencies provided by the plurality of auxiliary clock frequency units may be 630 MHz, 610 MHz, 590 MHz, . . . (with a tolerance of 20 MHz), or 618 MHz, 587 MHz, 557 MHz, . . . (with a common ratio of 5%). Of course, the auxiliary clock frequencies may also have other types of correlations with the main clock frequency, which are not specifically limited herein.

In some embodiments, the auxiliary clock frequency units may further include a backstop auxiliary clock frequency unit configured to provide a lowest clock frequency acceptable for a process of computing cores or a chip, or configured to provide a clock frequency required by the computing core having a poorest computing power among the plurality of computing cores (in the chip). The clock frequency provided by the backstop auxiliary clock frequency unit may be a fixed value. In some other embodiments, the clock frequency provided by the backstop auxiliary clock frequency unit may also be determined by causing the backstop auxiliary clock frequency unit to provide the clock frequency to all the computing cores in the chip and then executing the above frequency searching method for the single clock frequency unit.

From the above various frequency setting manners for auxiliary clock frequency units, the specific frequency setting manner may be selected according to various factors such as a specific manufacturing process for a chip including the computing cores. For example, the specific frequency setting manner may be selected according to the distribution of process variations among different computing cores in the case of a specific manufacturing process for a chip. In some embodiments, the distribution of process variations is linear, and a setting manner that a plurality of auxiliary clock frequencies forms an arithmetic progression along with the main clock frequency may be used. In some embodiments, the distribution of process variations is a pow-law distribution, and a setting manner that a plurality of auxiliary clock frequencies forms a geometric progression along with the main clock frequency may be used. In some embodiments, the distribution of process variations includes several maximum variations, and the setting method shown in FIG. 5 may be used.

In addition, in the case where a plurality of auxiliary clock frequency units is included, switching the computing cores abnormally operating to different auxiliary clock frequency units respectively may be carried out according to a switching manner that is set, which has a plurality of types, such as a random switching manner, a polling switching manner, a grade-by-grade switching manner, etc. For example, for the grade-by-grade switching manner, in some embodiments, grade-by-grade switching computing cores abnormally operating to a plurality of auxiliary clock frequency units may include: grading the plurality of auxiliary clock frequency units in descending order of auxiliary clock frequencies provided thereby, causing an auxiliary clock frequency unit at a highest grade providing a highest auxiliary clock frequency among the plurality of auxiliary clock frequency units to provide the auxiliary clock frequency for the computing cores abnormally operating, taking the auxiliary clock frequency unit at the highest grade as a current auxiliary clock frequency unit, and carry out the following grade-by-grade switching process on the current auxiliary clock frequency unit circularly: testing all the computing cores for which the current auxiliary clock frequency unit provides the auxiliary clock frequency, so as to determine whether there is a computing core abnormally operating; when there is a computing core abnormally operating, causing an auxiliary clock frequency unit at a lower grade next to a grade of the current auxiliary clock frequency unit to provide the auxiliary clock frequency for the computing cores abnormally operating, causing the current auxiliary clock frequency unit to provide the auxiliary clock frequency for the computing cores normally operating, and taking the auxiliary clock frequency unit at the lower grade next to the grade of the current auxiliary clock frequency unit as an updated current auxiliary clock frequency unit; and when there is no computing core abnormally operating or there is no auxiliary clock frequency unit at a lower grade next to a grade of the current auxiliary clock frequency unit, ending the grade-by-grade switching process. In some embodiments, when grade-by-grade switching the auxiliary clock frequency units is carried out, operations may be similar to those for the main clock frequency unit, that is, the auxiliary clock frequency unit at a current grade is regarded as the "main clock frequency unit", the auxiliary clock frequency unit at a lower grade is regarded as the "auxiliary clock frequency unit" relative to the auxiliary clock frequency unit at the current grade, and then the above pass rate test is carried out on the auxiliary clock frequency unit at the current grade, and when the pass rate is lower than a preset threshold, some or all of the computing cores abnormally operating are switched to the auxiliary clock frequency unit at the lower grade, which will not be repeated herein.

Figure 6:
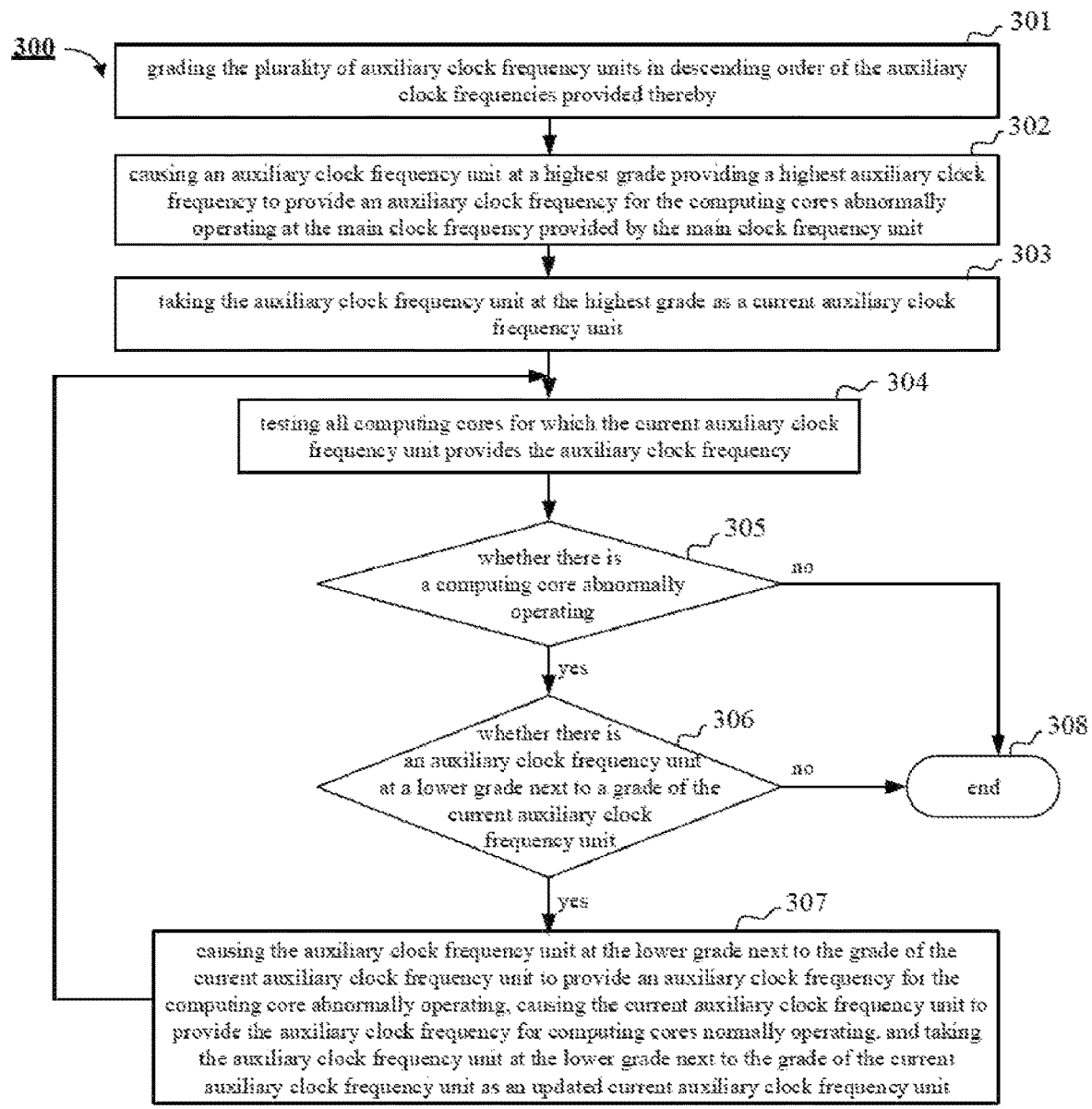
FIG. 6 is a flow diagram illustrating a method for grade-by-grade switching computing cores to a plurality of auxiliary clock frequency units according to some embodiments of the present disclosure.

Specifically, FIG. 6 illustrates an exemplary process 300 of a grade-by-grade switching manner for a plurality of auxiliary clock frequency units in detail. At step 301, a plurality of auxiliary clock frequency units may be graded in descending order of auxiliary clock frequencies provided thereby. For example, an auxiliary clock frequency unit providing a highest auxiliary clock frequency is assigned to a highest grade, and an auxiliary clock frequency unit providing a lowest auxiliary clock frequency is assigned to a lowest grade. At step 302, the auxiliary clock frequency unit at the highest grade providing the highest auxiliary clock frequency among the plurality of auxiliary clock frequency units is caused to provide the auxiliary clock frequency to computing cores abnormally operating at the main clock frequency (such as the first main clock frequency for the step 105, the second main clock frequency for the step 1045, etc.) provided by the main clock frequency unit. At step 303, the auxiliary clock frequency unit at the highest grade is taken as a current auxiliary clock frequency unit. Thereafter, the following grade-by-grade switching process may be circularly carried out on the current auxiliary clock frequency unit: at step 304, all the computing cores for which the current auxiliary clock frequency unit provides the auxiliary clock frequency may be tested; at step 305, it may be determined whether there is a computing core abnormally operating, if yes, the process may proceed to step 306, if not, the process may proceed to step 308 to end the grade-by-grade switching process; at the step 306, it may be determined whether there is an auxiliary clock frequency unit at a lower grade next to a grade of the current auxiliary clock frequency unit, if yes, the process may proceed to step 307, if not, the process may proceed to the step 308 to end the grade-by-grade switching process; at the step 307, the auxiliary clock frequency unit at the lower grade next to the grade of the current auxiliary clock frequency unit may be caused to provide the auxiliary clock frequency to the computing cores abnormally operating, the current auxiliary clock frequency unit may be caused to provide the auxiliary clock frequency to the computing cores normally operating, the auxiliary clock frequency unit at the lower grade next to the grade of the current auxiliary clock frequency unit may be taken as an updated current auxiliary clock frequency unit, and then the process may return to the step 304. In some embodiments, if the result in the step 306 is "No", that is, there is a computing core abnormally operating and there is no auxiliary clock frequency unit at a lower grade, the frequency provided by the current auxiliary clock frequency unit may also be decreased.

In addition, for the computing cores switched to the corresponding auxiliary clock frequency units in any switching manner, corresponding relations between the computing cores and the auxiliary clock frequency units are not only fixed. Since external conditions (such as a voltage of a chip) may change, previous determination of whether a computing core normally operates may be wrong, or there may be other reasons, the corresponding relations between the computing cores and the clock frequency units may be adjusted after the first switching. In addition to switching the computing cores abnormally operating downward to an auxiliary clock frequency unit that provides a lower clock frequency (such as the above grade-by-grade switching), the computing cores normally operating or even having excellent performances may be switched upward to an auxiliary clock frequency unit that provides a higher clock frequency or even switched back to the main clock frequency unit.

In some embodiments, when an external condition (such as a voltage of a chip) changes, operating conditions of computing cores for which each of the plurality of auxiliary clock frequency units provides the clock frequency may be tested; when a time period in which a computing core for which the auxiliary clock frequency unit provides the clock frequency keep normally operating exceeds a predetermined threshold time period, the computing core is switched to a clock frequency unit among the plurality of auxiliary clock frequency units and the main clock frequency unit that provides a clock frequency higher than the clock frequency provided by the auxiliary clock frequency unit.

The predetermined threshold time period may be set according to experience or according to actual needs. In some embodiments, the predetermined threshold time period may be related to the number of switching that the computing core has been subjected to. In some examples, as the computing core has been subjected to more number of downward switching, the predetermined threshold time period for determining whether the computing core can be upward switched to a clock frequency unit providing a higher clock frequency may be set longer. In some embodiments, the predetermined threshold time period may be related to the clock frequency provided by the auxiliary clock frequency unit to which the computing core currently corresponds. In some examples, as the clock frequency provided by the auxiliary clock frequency unit to which the computing cores currently correspond is higher, the predetermined threshold time period for determining whether the computing core can be upward switched to a clock frequency unit providing a higher clock frequency may be set longer.

In some embodiments, in a time period exceeding the predetermined threshold time period, test stimuli may be sent to the computing core for a plurality of times so as to check the operating condition thereof. If the computing core may always return correct results, it is indicated that the computing core always normally operates in this time period. In some embodiments, when the time period in which the computing core keep normally operating at the clock frequency provided by the corresponding auxiliary clock frequency unit exceeds the predetermined threshold time period, the computing core may be upward switched to the auxiliary clock frequency unit by one or more grade. if, after the switching, a time period in which the computing core may still keep normally operating exceeds the predetermined threshold time period, the computing core may be further upward switched to the auxiliary clock frequency unit by one or more grade. If the computing core already corresponds to the auxiliary clock frequency unit at the highest grade, when a time period in which the computing core keeps normally operating at the highest auxiliary clock frequency provided by the auxiliary clock frequency unit at the highest grade corresponding thereto exceeds the predetermined threshold time period, the computing core may be switched back to the main clock frequency unit. If, after the switching, the computing core may not normally operate (which, for example, may be determined by means of a plurality of testing), the computing core may be switched back to the auxiliary clock frequency unit at the previous grade (or a lower grade next thereto). In some embodiments, the following limitations may be made: once an computing core having been subjected to one or more upward switching further undergoes one downward switching, it will not undergo additional switching anymore.

In some embodiments, the above methods according to the present disclosure may be carried out when a chip including the computing cores is initialized. Since the above method is carried out in an initialization stage before the chip or a data processing device including the chip (such as a computer, a virtual currency mining machine, etc.) normally works, a corresponding relation between a plurality of computing cores included in the chip and a plurality of clock frequency units and the clock frequencies provided by the respective clock frequency units are determined, such that after the chip or the data processing device is started to normally work, operating frequencies of the computing cores are not required to be adjusted anymore, thereby promoting stable operating of the chip, and facilitating an improved computing power and a decreased power consumption-computing power ratio of the chip as a whole.

In the above methods, the "pass rate threshold" is used as a determination condition of whether to switch the clock frequency unit, such that the overall computing power of all the computing cores of the chip may be comprehensively considered as a whole. Switching computing cores having poorer performances to an auxiliary clock frequency unit may be conducive to improving the pass rate of computing cores remained on the main clock frequency unit for normal operation (i.e., good core ratio), thereby helping the computing cores having better performances and remained on the main clock frequency unit to realize frequency increase as a whole.

In the above methods, the main clock frequency unit may be in a dynamic frequency increase process as a whole, and then a final frequency may be determined by using a frequency searching method including frequency increase/frequency decrease when a limit is approached. The auxiliary clock frequency unit may provide a fixed frequency, may also provide a frequency that changes as the main clock frequency changes, and the final frequency may be independently determined by using a frequency searching method including frequency increase/frequency decrease. A frequency adjustment process for the auxiliary clock frequency unit may be independent of a frequency adjustment process for the main clock frequency unit, and the two are not in conflict.

A specific exemplary flow of determining a corresponding relation between a plurality of computing cores and a plurality of clock frequency units included in a chip as well as clock frequencies of the respective clock frequency units is described below.

Firstly, the chip is powered on, the main clock frequency unit of the chip is enabled, and a relatively low initial frequency is set for the main clock frequency unit, all the computing cores of the chip may be distributed to the main clock frequency unit. Specifically, in order to make the chip warm up and keep stably operating, the clock frequency provided by the main clock frequency unit may generally gradually increase from low to high. For example, the initial frequency may be an empirical value artificially set, or may be a lowest clock frequency acceptable for a process of the chip, or may be a clock frequency required by a computing core having a poorest computing power in the chip, or may be determined by causing the main clock frequency unit to provide a clock frequency to all computing cores in the chip and then executing the above frequency searching method for the single clock frequency unit. Subsequent steps may be carried out after the chip is warmed up (at this time, a state of the circuit is relatively stable).

Then, a computing power test is carried out on all computing cores at the initial frequency. Since the initial frequency is relatively low, the pass rate of the computing cores for normal operation at this time may often reach a preset upper threshold.

Next, the frequency provided by the main clock frequency unit is increased (e.g., progressively increased by a preset fixed value). In some cases, when the pass rate reaches a preset upper threshold but is not 100%, the following process may be additionally carried out: an auxiliary clock frequency unit(s) is enabled and an auxiliary clock frequency(frequencies) is set for the auxiliary clock frequency unit(s) in the manner as described above, and then at least a portion of computing cores abnormally operating is switched to the auxiliary clock frequency unit(s), so as to expand the space for increasing a frequency of the main clock frequency unit.

When the clock frequency of the main clock frequency unit increases to a certain value, the pass rate of the computing cores for normal operation may be lower than a preset lower threshold, which indicates that more computing cores may not normally operate. At this time, an auxiliary clock frequency unit(s) may be enabled and an auxiliary clock frequency(frequencies) is set for the auxiliary clock frequency unit(s) in the manner as previously described, and then at least a portion of computing cores abnormally operating is switched to the auxiliary clock frequency unit(s).

At this time, since some computing cores having poor performances are switched away, computing cores remained on the main clock frequency unit may generally exhibit a higher pass rate as a whole, and when the pass rate is higher than the preset upper threshold, the frequency provided by the main clock frequency unit may be continued to be increased (for example, progressively increased by a preset fixed value). If in the subsequent frequency increase process, it is found that even after the computing cores having poor performances are removed, the computing cores remained on the main clock frequency unit still exhibit a pass rate lower than the preset lower threshold as a whole, which indicates that the chip has approached its limit, and therefore the frequency provided by the main clock frequency unit may be decreased. When the pass rate of the computing cores remained on the main clock frequency unit at a certain main clock frequency is between the preset upper threshold and the preset lower threshold, the main clock frequency may be determined as the clock frequency to be finally provided by the main clock frequency unit, and the computing cores currently remained on the main clock frequency unit may be determined as the computing cores for which the main clock frequency unit provides clock frequencies in the chip. Independently, after the switching and frequency adjustment of the auxiliary clock frequency units are completed, the current clock frequency of each auxiliary clock frequency unit may be determined as the clock frequency to be finally provided by the auxiliary clock frequency unit, and the computing cores currently remained on each auxiliary clock frequency unit may be determined as the computing cores for which each auxiliary clock frequency unit provides the clock frequency in the chip.

Therefore, the method for providing clock frequencies for computing cores according to the present disclosure can improve the overall computing power and reduce the power consumption-computing power ratio for the plurality of computing cores.

Figure 10:
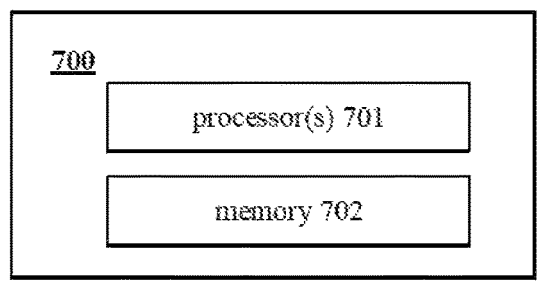
FIG. 10 is a schematic block diagram illustrating a computing apparatus according to some embodiments of the present disclosure.

The present disclosure further provides a computing apparatus including: one or more processors; and a memory storing computer-executable instructions which, when executed by the one or more processors, cause the one or more processors to execute the method according to any embodiment of the first aspect of the present disclosure. As shown in FIG. 10, the computing apparatus 700 may include a processor(s) 701 and a memory 702 storing computer-executable instructions which, when executed by the processor(s) 701, cause the processor(s) 701 to execute the method according to any embodiment of the first aspect of the present disclosure. The processor(s) 701 may be, for example, a central processing unit (CPU) of the computing apparatus 700. The processor(s) 701 may be any type of general purpose processor, or may be a processor specifically designed to determine how to provide clock frequencies for computing cores in a chip, such as an application specific integrated circuit ("ASIC"). The memory 702 may include various computer-readable media that are accessible by the processor(s) 701. In various embodiments, the memory 702 described herein may include volatile and nonvolatile media, and removable and non-removable media. For example, the memory 702 may include any combination of: a random access memory ("RAM"), a dynamic random access memory ("DRAM"), a static random access memory ("SRAM"), a read-only memory ("ROM"), a flash memory, a cache memory and/or any other type of non-transitory computer-readable medium. The memory 702 may store an instruction that, when executed by the processor 701, causes the processor 701 to carry out the method according to any embodiment of the first aspect of the present disclosure.

In addition, the present disclosure may further provide a non-transitory storage medium having computer-executable instructions stored thereon which, when executed by a computer, cause the computer to execute the method according to any embodiment of the first aspect of the present disclosure.

A second aspect of the present disclosure provides a chip which may include a plurality of computing cores, and a main clock frequency unit and an auxiliary clock frequency unit for providing clock frequencies for the plurality of computing cores, wherein computing cores for which the main clock frequency unit provides a clock frequency among the plurality of computing cores, the clock frequency provided by the main clock frequency unit, computing cores for which the auxiliary clock frequency unit provides a clock frequency among the plurality of computing cores and the clock frequency provided by the auxiliary clock frequency unit may be determined by the method according to any embodiment of the first aspect of the present disclosure.

Figure 9:
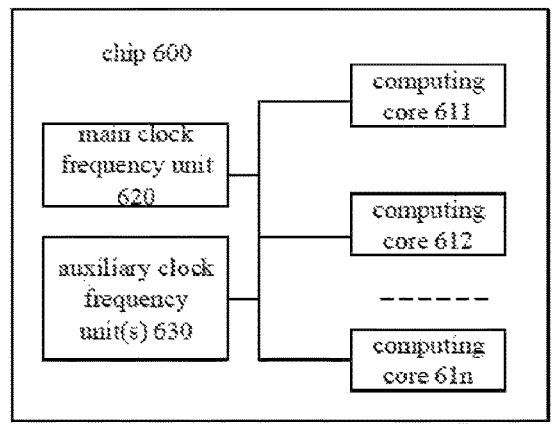
FIG. 9 is a schematic block diagram illustrating a chip according to some embodiments of the present disclosure.

FIG. 9 illustrates a chip 600 according to some embodiments of the second aspect of the present disclosure. The chip 600 may include a plurality of computing cores 611, 612, . . . , 61*n*, as well as a main clock frequency unit 620 and an auxiliary clock frequency unit(s) 630. The main clock frequency unit 620 and the auxiliary clock frequency unit(s) 630 may provide clock frequencies for corresponding computing cores of the plurality of computing cores 611, 612, . . . , 61*n*. Computing cores for which the main clock frequency unit 620 provides a clock frequency among the plurality of computing cores 611, 612, . . . , 61n, the clock frequency provided by the main clock frequency unit 620, computing cores for which the auxiliary clock frequency unit(s) 630 provides a clock frequency among the plurality of computing cores 611, 612, . . . , 61n, and the clock frequency provided by the auxiliary clock frequency unit(s) 630 may be determined by the method according to any embodiment of the first aspect of the present disclosure. It should be understood that other components may be present in the actual chip 600, but are not discussed herein and not illustrated in the accompanying drawings in order to avoid obscuring the gist of the present disclosure.

A third aspect of the present disclosure may further provide a data processing device including one or more chips according to the second aspect of the present disclosure. In some embodiments, the data processing device may be a virtual currency mining machine.

In order to improve computing power and decrease a power consumption-computing power ratio for a computer having a plurality of computing cores, such as a virtual currency mining machine, a fourth aspect of the present disclosure further provides a method for improving computing power and decreasing a power consumption-computing power ratio for a computer having a plurality of computing cores, which includes: providing a main clock frequency unit and at least one auxiliary clock frequency unit in each chip of the computer having the plurality of computing cores, where a clock frequency provided by the main clock frequency unit, computing cores for which the main clock frequency unit provides the clock frequency in the chip, and computing cores for which the auxiliary clock frequency unit provides the clock frequency in the chip are determined via a test, so as to satisfy a pass rate of the computing cores in the chip for normal operation being greater than or equal to a set pass rate threshold, so as to enable a maximum number of computing cores in the chip to normally operate.

In some embodiments, the clock frequency provided by the auxiliary clock frequency unit may be a preset value, or may be determined according to the clock frequency provided by the main clock frequency unit and a preset step difference. In some embodiments, the clock frequency provided by the auxiliary clock frequency unit may be determined in any suitable manner as described above in the first aspect of the present disclosure for setting an auxiliary clock frequency of an auxiliary clock frequency unit.

In an embodiment of the present disclosure, each of the main clock frequency unit and the auxiliary clock frequency unit may be a phase-locked loop (PLL) module or a frequency-locked loop (FLL) module, as long as they can provide clock frequencies for computing cores.

Figure 7:
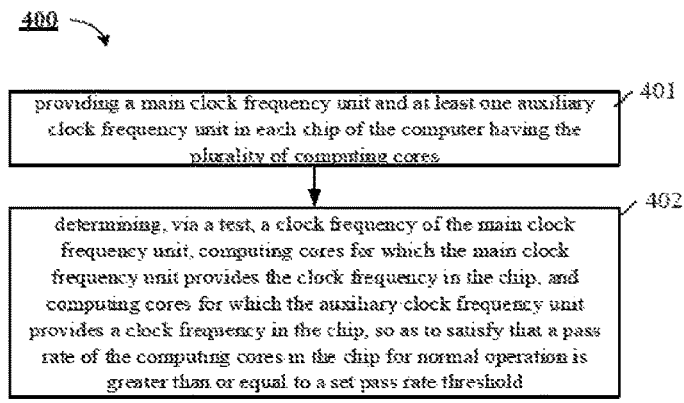
FIG. 7 is a flow diagram illustrating a method for increasing computing power and decreasing a power consumption-computing power ratio of a computer having a plurality of computing cores according to some embodiments of the present disclosure.

FIG. 7 shows a flow diagram of a method 400 for improving computing power and decreasing a power consumption-computing power ratio for a computer having a plurality of computing cores according to some embodiments of a fourth aspect of the present disclosure. The method 400 may include the steps as follows:

at step 401: providing a main clock frequency unit and at least one auxiliary clock frequency unit in each chip of a computer having a plurality of computing cores; and at step 402: determining a clock frequency of the main clock frequency unit, computing cores for which the main clock frequency unit provides the clock frequency in the chip, and computing cores for which the auxiliary clock frequency unit provides the clock frequency in the chip via a test, so as to satisfy a pass rate of the computing cores in the chip for normal operation being greater than or equal to a set pass rate threshold.

In some embodiments, a clock frequency provided by the auxiliary clock frequency unit may be a preset value. In some embodiments, a clock frequency provided by the auxiliary clock frequency unit may be determined according to the clock frequency provided by the main clock frequency unit and a preset step difference, and specifically may be set as a difference between the clock frequency provided by the main clock frequency unit and the preset step difference. In some embodiments, a clock frequency provided by the auxiliary clock frequency unit may be determined in any suitable manner as described above in the first aspect of the present disclosure for setting an auxiliary clock frequency of an auxiliary clock frequency unit.

In some embodiments, there may be at least one auxiliary clock frequency unit each providing a clock frequency for different computing cores. In some embodiments, a clock frequency provided by each of the at least one auxiliary clock frequency unit may be a preset value. In some embodiments, a clock frequency provided by each of the at least one auxiliary clock frequency unit may be determined according to the clock frequency provided by the main clock frequency unit and a preset step difference. In some embodiments, a clock frequency provided by each of the at least one auxiliary clock frequency unit may be determined in any suitable manner as described above in the first aspect of the present disclosure for setting an auxiliary clock frequency of an auxiliary clock frequency unit. The clock frequencies provided by different auxiliary clock frequency units of the at least one auxiliary clock frequency unit may be different.

In some embodiments, the test is carried out when the computer having the plurality of computing cores is initialized.

In some embodiments, determining a clock frequency of the main clock frequency unit, computing cores for which the main clock frequency unit provides the clock frequency in the chip, and computing cores for which the auxiliary clock frequency unit provides the clock frequency in the chip via a test may include: carrying out the method according to any embodiment of the first aspect of the present disclosure.

Figure 8:
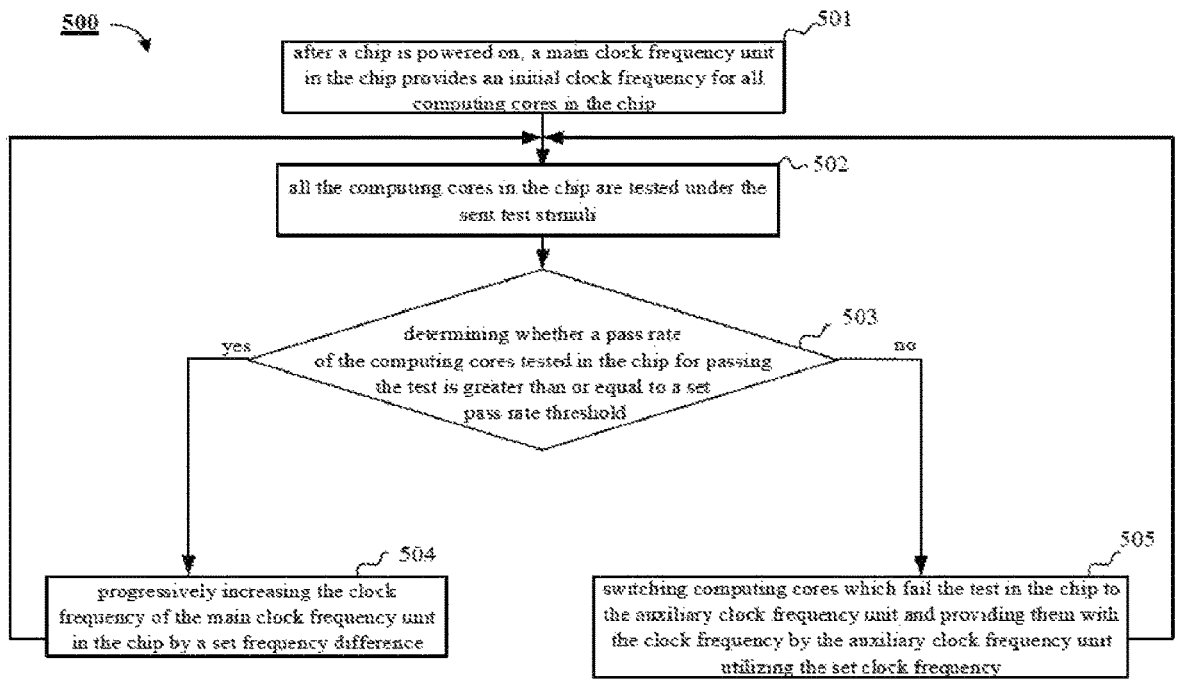
FIG. 8 is a flow diagram illustrating a testing process according to some embodiments of the present disclosure.

FIG. 8 specifically shows a flow diagram of an example method 500 of a test process according to some embodiments of the fourth aspect of the present disclosure. The method 500 may specifically include steps as follows.

At step 501, after a chip is powered on, a main clock frequency unit in the chip is caused to provide an initial clock frequency for all computing cores in the chip. In some embodiments, the initial clock frequency provided by the main clock frequency unit in the chip may be a relatively low frequency value. Specifically, in order to make the computer having the plurality of computing cores warm up and keep stably operating, the clock frequency provided by the main clock frequency unit is generally gradually increased from low to high. The initial clock frequency of the main clock frequency unit may be as discussed above in the first aspect. In some embodiments, a clock frequency provided by an auxiliary clock frequency unit may be determined by the clock frequency required by the computing core having the poorest computing power in the chip, and the clock frequency required by the computing core having the poorest computing power in the chip is determined on the basis of an empirical value of the clock frequency required by the computing core in the case of the same process condition. Of course, the frequency of the auxiliary clock frequency unit may also be set as discussed above in the first aspect.

At step 502, all the computing cores in the chip are tested under the sent test stimuli (or test vectors). In some embodiments, the test stimuli may be sent to the computing cores in each chip by a central processing unit of the computer, and the computing core operates based on the test stimulus after receiving the test stimulus, and feeds back a test stimulus response such that the central processing unit of the computer may subsequently determine whether the computing core normally operates according to the stimulus response, if yes, the computing core passes the test, and if not, the computing core fails the test. The test pass rate of the computing cores may also be regarded as the pass rate of the computing cores for normal operation.

At step 503, it is determined whether a test pass rate of the computing cores tested in the chip is greater than or equal to a set pass rate threshold, if yes, step 504 is executed, and if not, step 505 is executed.

At the step 504, the clock frequency of the main clock frequency unit in the chip is progressively increased by a set frequency difference, and the method returns to the step 502 to continue execution. For example, the set frequency difference may be a preset empirical value, which is not specifically limited herein.

At the step 505, computing cores which fail the operating test in the chip are switched to the auxiliary clock frequency unit and are provided with the clock frequency by the auxiliary clock frequency unit utilizing the set clock frequency, and the method returns to the step 502 for execution. In some embodiments, the clock frequency provided by the auxiliary clock frequency unit may be a fixed value, and the fixed value may be an empirical value of a slowest clock frequency of the chip in the case of process conditions, that is, a short board value of a short board effect, e.g., a clock frequency required by a computing core having the poorest computing power in the chip. In some embodiments, the clock frequency provided by the auxiliary clock frequency unit may also be a changing value, which is determined according to the clock frequency provided by the main clock frequency unit, for example, according to the clock frequency provided by the main clock frequency unit and a preset step difference that may be determined according to a combination of working clock difference ranges of different computing cores in the chip in the case of process conditions and an empirical value. In addition, in some embodiments, the clock frequency of the auxiliary clock frequency unit may also be determined according to the manner described in the first aspect of the present disclosure.

In some embodiments, if there is a plurality of auxiliary clock frequency units, the computing cores that fail the operating test in the chip may also be switched to different auxiliary clock frequency units respectively, and the different auxiliary clock frequency units provide clock frequencies for the computing cores switched thereto. Herein, as mentioned above, the computing cores that fail the operating test in the chip may be switched to different auxiliary clock frequency units respectively according to set switching manners which have a plurality of types such as a random switching manner, a polling switching manner, a grade-by-grade switching manner, etc.

In the process shown in FIG. 8, although the clock frequency unit (which may be a main clock frequency unit or an auxiliary clock frequency unit) providing the clock frequency for computing cores in the chip will be determined by switching the computing cores for a plurality of times, since the process shown in FIG. 8 is carried out during testing, specifically when the computer is initialized, clock frequency switching of the computing cores will not be carried out in a subsequent working state of the computer, and working stability of each chip in the computer will not be affected.

In the process in FIG. 8, the step 503 of determining whether a pass rate of the computing cores tested in the chip for passing the test is greater than or equal to a set pass rate threshold further includes: when it is determined that the pass rate of the computing cores tested in the chip for passing the test is equal to the set pass rate threshold, or exceeds the pass rate threshold by an amount within a set range, ending the test process; and when the test process is ended, taking a clock frequency currently provided by the main clock frequency unit, computing cores for which the main clock frequency unit currently provides the clock frequency, and computing cores for which the auxiliary clock frequency unit currently provides the clock frequency as the clock frequency of the main clock frequency unit in the chip, the computing cores for which the main clock frequency unit provides the clock frequency, and the computing cores for which the auxiliary clock frequency unit provides the clock frequency respectively.

The set range may usually be a settable small range. In some embodiments, the set range is an empirical value such that the pass rate does not excessively exceed the pass rate threshold, for example, a difference between them is only a single digit. That is to say, the set range is actually a revised range value of the pass rate threshold, so as to ensure that when an amount by which the pass rate exceeds the pass rate threshold falls within the set range, the whole test may also be ended. If the set range is set to be too large, there may be a problem that the most appropriate clock frequency may not be finally determined for each computing core in the chip in the whole test, and the process shown in FIG. 8 is required to be continued to be executed until the most appropriate clock frequency is determined for each computing core in the chip.

A non-limiting example of the test method using the embodiments of the present disclosure is described below in detail by taking a computer having a plurality of computing cores being a virtual currency mining machine as an example.

In a first step, a chip in the virtual currency mining machine is powered on, and two or more clock frequency units of the chip are enabled at the same time. Herein, the number of the enabled clock frequency units depends on the number of the clock frequency units in the chip, and one clock frequency unit having the best performance may be set as a main clock frequency unit, which provides a relatively low initial clock frequency and gradually increases from low clock frequency to high clock frequency to test the computing cores in the chip; meanwhile, other clock frequency units are set as auxiliary clock frequency units, and a fixed clock frequency is set whose value is an empirical value of a slowest frequency of the chip in the case of process conditions, that is, a short board value of a short board effect. According to the number of available auxiliary clock frequency units, relatively lower clock frequency values are set in steps, that is, the fixed clock frequencies set by different auxiliary clock frequency units may be different. In the first step, the performance of each clock frequency unit may be known according to the process conditions set by the chip, and the clock frequency unit having the best performance is used as the main clock frequency unit.

In a second step, the main clock frequency unit is used to provide a clock frequency from low to high for each computing core in the chip, where the clock frequency is increased by a set frequency difference each time starting from a low value; a test stimulus is sent to cause each computing core in the chip to be subjected to an operating test; whether all the computing cores pass the test is checked; when a pass rate meets a requirement, the clock frequency is continued to be increased; and when the pass rate does not meet the requirement, further analysis is carried out.

In a third step, when the pass rate does not meet the requirement, that is, some computing cores having large process variations may fail to normally operate at the current clock frequency, such that an operating test failure rate of the computing cores in the chip increases, and the clock frequency of the main clock frequency unit cannot be further increased, otherwise, many computing cores would fail to normally operate and the computing power would be lost. At this time, these computing cores may be switched to the previously set auxiliary clock frequency unit providing a relatively lower clock frequency, and the main clock frequency unit is continued to provide the clock frequency for the remaining computing cores, while the main clock frequency unit keeps increasing its frequency.

In a fourth step, after the operating test, the computing cores switched to the auxiliary clock frequency unit may successfully pass the test, and the frequency of the auxiliary clock frequency unit is previously set and does not change, such that these computing cores may stably work. In this way, an overall test pass rate is improved and the main clock frequency unit keeps increasing its clock frequency, when there is another batch of computing cores that fails an operating test, the third step and the fourth step are continued to be repeated, if there are other auxiliary clock frequency units not used, for example, providing clock frequencies faster than that of the slowest auxiliary clock frequency unit, the new batch of computing cores failing the test may be switched to a new auxiliary clock frequency unit such that more computing power may be improved.

In this way, the embodiments of the present disclosure make most computing cores in the chip have the highest computing power that they may have by switching a few computing cores having weak computing power in the chip to the auxiliary clock frequency unit providing a relatively low clock frequency, thereby effectively improving the computing power and decreasing a power consumption-computing power ratio.

A fifth aspect of the present disclosure further provides a system for improving computing power and decreasing a power consumption-computing power ratio for a computer having a plurality of computing cores. The system may include at least one chip (such as a chip 600 in FIG. 9) of the computer having the plurality of computing cores, where each chip may include a main clock frequency unit, an auxiliary clock frequency unit and a plurality of computing cores. The main clock frequency unit may be used for providing a clock frequency for a portion of the computing cores in the chip. The auxiliary clock frequency unit may be used for providing a clock frequency for another portion of the computing cores in the chip. The clock frequency of the main clock frequency unit, the computing cores for which the main clock frequency unit provides the clock frequency in the chip, and the computing cores for which the auxiliary clock frequency unit provides the clock frequency in the chip are determined via a test, so as to satisfy a pass rate of the computing cores in the chip for normal operation being greater than or equal to a set pass rate threshold.

In some embodiments, determining the clock frequency of the main clock frequency unit, the computing cores for which the main clock frequency unit provides the clock frequency in the chip, and the computing cores for which the auxiliary clock frequency unit provides the clock frequency in the chip via a test may include carrying out the method according to any embodiment of the first aspect of the present disclosure.

In some embodiments, the system may further include a central processor. The central processor may be used for controlling clock frequencies of the main clock frequency unit and the auxiliary clock frequency unit and switching the main clock frequency unit and the auxiliary clock frequency unit for computing cores. The central processor may also be used to send test stimuli to the computing cores.

In some embodiments, the clock frequency provided by the auxiliary clock frequency unit may be set by using various frequency setting methods described according to the first aspect of the present disclosure. In some embodiments, the clock frequency provided by the auxiliary clock frequency unit may be a preset value. In some embodiments, the clock frequency provided by the auxiliary clock frequency unit may be determined according to the clock frequency provided by the main clock frequency unit and a preset step difference, and specifically may be set as a difference between the clock frequency provided by the main clock frequency unit and the preset step difference.

In some embodiments, the test may be carried out when the system is initialized.

In some embodiments, the system may include at least one auxiliary clock frequency unit, and each auxiliary clock frequency unit may provide a clock frequency for different computing cores respectively. In some embodiments, the clock frequency provided by each auxiliary clock frequency unit may be set by using various frequency setting methods described according to the first aspect of the present disclosure. In some embodiments, the clock frequency provided by each auxiliary clock frequency unit may be a preset value. In some embodiments, the clock frequency provided by each auxiliary clock frequency unit may be determined according to the clock frequency provided by the main clock frequency unit and a preset step difference. The clock frequencies provided by different auxiliary clock frequency units may be different.

If clock frequency units in a chip are frequently and dynamically switched in a working state of a computer having a plurality of computing cores such as a virtual currency mining machine, a voltage of the chip will be unstable, thereby affecting the stability of the computer having the plurality of computing cores. The embodiments of the present disclosure use the test method to determine a clock frequency of a main clock frequency unit, computing cores for which the main clock frequency unit provides the clock frequency in the chip, and computing cores for which an auxiliary clock frequency unit provides a clock frequency in the chip during the initialization stage of the chip, such that the clock frequency units in the chip are not required to be frequently switched in the actual operation, thereby maintaining working stability of the computer having the plurality of computing cores; meanwhile, the computing cores having relatively poor computing power can be properly switched to the corresponding auxiliary clock frequency units at a plurality of grades and provided with clock frequencies by the auxiliary clock frequency units at the plurality of grades, and the computing power of the computing cores in the chip does not need to be improved by increasing the voltage of the chip, such that the computer having the plurality of computing cores such as the virtual currency mining machine has higher computing power and a lower power consumption-computing power ratio.

If there are words "left", "right", "front", "rear", "top", "bottom", "upper", "lower", "high", "low", etc. in the description and the claims, these words are used for descriptive purposes and not necessarily for describing constant relative positions. It should be understood that the terms so used are interchangeable under appropriate conditions such that the embodiments of the present disclosure described herein are, for example, capable of being carried out in other orientations than those illustrated or otherwise described herein. For example, when an apparatus in the figure is turned over, a feature originally described as being "above" another feature may now be described as being "below" the other feature. The apparatus may also be otherwise oriented (rotated by 90 degrees or at other orientations), in which case relative spatial relations will be interpreted accordingly.

In the description and the claims, when an element is referred to as being "on", "attached to", "connected to", "coupled to" or "in contact with" another element, etc., it may be directly on, attached to, connected to, coupled to or in contact with the other element, or there may be one or more intervening elements. In contrast, when an element is referred to as being "directly on", "directly attached to", "directly connected to", "directly coupled to" or "in direct contact with" another element, there are no intervening elements. In the description and the claims, a feature arranged "adjacent to" another feature may mean that the feature has a portion that overlaps the adjacent feature, or a portion above or below the adjacent feature.

As used herein, the word "exemplary" means "serving as an example, instance or illustration", rather than as a "model" to be accurately reproduced. Any implementation described herein as exemplary is not necessarily to be construed as preferred or advantageous over other implementations. Moreover, the present disclosure is not limited by any expressed or implied theory presented in the technical field, background, summary, or detailed description. As used herein, the word "substantially" is meant to encompass any slight variation due to imperfections in design or manufacturing, tolerances of devices or elements, environmental influences and/or other factors. The word "substantially" also allows for variations from a perfect or ideal situation due to parasitics, noises, and other practical considerations that may be present in an actual implementation.

In addition, "first", "second" and similar terms may also be used herein for reference purposes only, and thus are not intended to be limiting. For example, the terms "first", "second" and other such numerical terms referring to structures or elements do not imply a sequence or order unless the context clearly indicates. It further should be understood that the term "include/comprise", when used herein, specify the presence of stated features, entireties, steps, operations, elements, and/or components, but do not preclude the presence or addition of one or more other features, entireties, steps, operations, elements, components, and/or combinations thereof. In the present disclosure, the term "provide" is used in a broad sense to encompass all ways for obtaining an object, and thus "provide an object" includes, but is not limited to, "purchase", "prepare/manufacture", "arrange/set up", "mount/assemble", and/or "order" an object. As used herein, the term "and/or" includes any and all combinations of one or more of associated items that are listed. The terms used herein are merely for the purpose of describing specific embodiments and are not intended to limit the present disclosure. As used herein, the singular forms "a", "an" and "the" are intended to include plural forms as well, unless otherwise explicitly indicated in the context.

Those skilled in the art should appreciate that the boundaries between the above operations are merely illustrative. A plurality of operations may be combined into a single operation, a single operation may be distributed in additional operations, and operations may be carried out in an at least partially overlapping manner in time. Moreover, alternative embodiments may include a plurality of examples of particular operations, and the order of the operations may be altered in other various embodiments. However, other modifications, variations, and alternatives are also possible. Aspects and elements of all of the embodiments disclosed above may be combined in any manner and/or in combination with aspects or elements of other embodiments, so as to provide a plurality of additional embodiments. Therefore, the description and the accompanying drawings should be regarded as illustrative rather than restrictive.

While certain specific embodiments of the present disclosure have been described in detail by way of examples, those skilled in the art should understand that the above examples are for purposes of illustration only and are not intended to limit the scope of the present disclosure. The various embodiments disclosed herein may be combined in any combination without departing from the spirit and scope of the present disclosure. Those skilled in the art should further understand that various modifications may be made to the embodiments without departing from the scope and spirit of the present disclosure. The scope of the present disclosure is limited by the appended claims.

What is claimed is:

1. A method for providing clock frequencies for computing cores, comprising:

causing a main clock frequency unit to provide a first main clock frequency for a plurality of computing cores, such that all of the plurality of computing cores are configured to operate at the first main clock frequency provided by the main clock frequency unit;

testing the plurality of computing cores operating at the first main clock frequency, so as to determine whether a pass rate of the plurality of computing cores for normal operation at the first main clock frequency is greater than a first pass rate upper threshold or less than a first pass rate lower threshold, wherein the pass rate of the plurality of computing cores for normal operation at the first main clock frequency is a ratio of a number of computing cores, among the plurality of computing cores, that normally operate at the first main clock frequency to the total number of the plurality of computing cores;

when the pass rate of the plurality of computing cores for normal operation at the first main clock frequency is less than the first pass rate lower threshold, causing an auxiliary clock frequency unit to provide a first auxiliary clock frequency lower than the first main clock frequency for computing cores abnormally operating at the first main clock frequency among the plurality of computing cores, such that those computing cores abnormally operating at the first main clock frequency are switched to the auxiliary clock frequency unit and are configured to operate at the first auxiliary clock frequency provided by the auxiliary clock frequency unit, and causing the main clock frequency unit to continue providing the first main clock frequency for the remaining computing cores among the plurality of computing cores, such that those remaining computing cores are remained at the main clock frequency unit and are configured to operate at the first main clock frequency provided by the main clock frequency unit; and when the pass rate of the plurality of computing cores for normal operation at the first main clock frequency is greater than the first pass rate upper threshold, causing the main clock frequency unit to provide a second main clock frequency higher than the first main clock frequency for the plurality of computing cores, such that all of the plurality of computing cores are remained at the main clock frequency unit and are configured to operate at the second main clock frequency provided by the main clock frequency unit, no matter whether the plurality of computing cores includes a computing core abnormally operating at the first main clock frequency.

2. The method for providing clock frequencies for computing cores according to claim 1, further comprising:

testing the plurality of computing cores operating at the second main clock frequency, so as to determine whether a pass rate of the plurality of computing cores for normal operation at the second main clock frequency is greater than the first pass rate upper threshold or less than the first pass rate lower threshold;

when the pass rate of the plurality of computing cores for normal operation at the second main clock frequency is less than the first pass rate lower threshold, causing the auxiliary clock frequency unit to provide a second auxiliary clock frequency lower than the second main clock frequency for computing cores abnormally operating at the second main clock frequency among the plurality of computing cores, and causing the main clock frequency unit to continue providing the second main clock frequency for the remaining computing cores among the plurality of computing cores; and when the pass rate of the plurality of computing cores for normal operation at the second main clock frequency is greater than the first pass rate upper threshold, causing the main clock frequency unit to provide a third main clock frequency higher than the second main clock frequency for the plurality of computing cores.

3. The method for providing clock frequencies for computing cores according to claim 1, further comprising, after the causing an auxiliary clock frequency unit to provide a first auxiliary clock frequency lower than the first main clock frequency for computing cores abnormally operating at the first main clock frequency among the plurality of computing cores:

testing the remaining computing cores operating at the first main clock frequency, so as to determine whether a pass rate of the remaining computing cores for normal operation at the first main clock frequency is greater than a second pass rate upper threshold or less than a second pass rate lower threshold;

when the pass rate of the remaining computing cores for normal operation at the first main clock frequency is less than the second pass rate lower threshold, causing the main clock frequency unit to provide a fourth main clock frequency lower than the first main clock frequency and higher than the first auxiliary clock frequency for the remaining computing cores; and when the pass rate of the remaining computing cores for normal operation at the first main clock frequency is greater than the second pass rate upper threshold, causing the main clock frequency unit to provide the second main clock frequency higher than the first main clock frequency for the remaining computing cores.

4. The method for providing clock frequencies for computing cores according to claim 3, further comprising, after the causing the main clock frequency unit to provide a fourth main clock frequency lower than the first main clock frequency and higher than the first auxiliary clock frequency for the remaining computing cores, determining a final main clock frequency that the main clock frequency unit is to be configured to provide through a process comprising the following steps:

a first step comprising: testing all computing cores for which the main clock frequency unit provides a main clock frequency at a main clock frequency currently provided by the main clock frequency unit, so as to determine whether a pass rate of the computing cores for normal operation at the main clock frequency is greater than a third pass rate upper threshold or less than a third pass rate lower threshold, executing a second step if the pass rate is greater than the third pass rate upper threshold, executing a third step if the pass rate is less than the third pass rate lower threshold, and executing a fourth step if the pass rate is between the third pass rate upper threshold and the third pass rate lower threshold or if a total number of execution of the second step and the third step exceeds a first predetermined number threshold;

the second step comprising: increasing the main clock frequency provided by the main clock frequency unit within a range less than the first main clock frequency, and returning to the first step;

the third step comprising: decreasing the main clock frequency provided by the main clock frequency unit within a range greater than the first auxiliary clock frequency, and returning to the first step; and the fourth step comprising: determining the main clock frequency currently provided by the main clock frequency unit as the final main clock frequency of the main clock frequency unit.

5. The method for providing clock frequencies for computing cores according to claim 3, further comprising:

testing the remaining computing cores operating at the second main clock frequency, so as to determine whether a pass rate of the remaining computing cores for normal operation at the second main clock frequency is greater than the second pass rate upper threshold or less than the second pass rate lower threshold;

when the pass rate of the remaining computing cores for normal operation at the second main clock frequency is less than the second pass rate lower threshold, causing the auxiliary clock frequency unit to provide a second auxiliary clock frequency lower than the second main clock frequency for computing cores abnormally operating at the second main clock frequency among the remaining computing cores; and when the pass rate of the remaining computing cores for normal operation at the second main clock frequency is greater than the second pass rate upper threshold, causing the main clock frequency unit to provide a third main clock frequency higher than the second main clock frequency for the remaining computing cores.

6. The method for providing clock frequencies for computing cores according to claim 1, wherein the auxiliary clock frequency unit includes a plurality of auxiliary clock frequency units configured to provide a plurality of different auxiliary clock frequencies.

7. The method for providing clock frequencies for computing cores according to claim 6, further comprising, when the pass rate of the plurality of computing cores for normal operation at the first main clock frequency is less than the first pass rate lower threshold:
- configuring each of the plurality of auxiliary clock frequency units to provide a fixed auxiliary clock frequency lower than the first main clock frequency; or
- configuring the plurality of auxiliary clock frequency units to provide a plurality of auxiliary clock frequencies that are lower than the first main clock frequency and form an arithmetic progression along with the first main clock frequency; or
- configuring the plurality of auxiliary clock frequency units to provide a plurality of auxiliary clock frequencies that are lower than the first main clock frequency and form a geometric progression along with the first main clock frequency; or
- configuring each of the plurality of auxiliary clock frequency units to provide an initial auxiliary clock frequency lower than the first main clock frequency, and determining a final auxiliary clock frequency that the auxiliary clock frequency unit is to be configured to provide through a process comprising the following steps:
  - a first step comprising: testing all computing cores for which the auxiliary clock frequency unit provides an auxiliary clock frequency at an auxiliary clock frequency currently provided by the auxiliary clock frequency unit, so as to determine whether a pass rate of the computing cores for normal operation at the auxiliary clock frequency is greater than a fourth pass rate upper threshold or less than a fourth pass rate lower threshold, executing a second step if the pass rate is greater than the fourth pass rate upper threshold, executing a third step if the pass rate is less than the fourth pass rate lower threshold, and executing a fourth step if the pass rate is between the fourth pass rate upper threshold and the fourth pass rate lower threshold or if a total number of execution of the second step and the third step exceeds a second predetermined number threshold;
  - the second step comprising: increasing the auxiliary clock frequency provided by the auxiliary clock frequency unit, and returning to the first step;
  - the third step comprising: decreasing the auxiliary clock frequency provided by the auxiliary clock frequency unit, and returning to the first step; and
  - the fourth step comprising: determining the auxiliary clock frequency currently provided by the auxiliary clock frequency unit as the final auxiliary clock frequency of the auxiliary clock frequency unit.

8. The method for providing clock frequencies for computing cores according to claim 7, wherein the auxiliary clock frequency units further comprise a backstop auxiliary clock frequency unit configured to provide a lowest clock frequency acceptable for a process of the computing cores, or configured to provide a clock frequency required by a computing core having a poorest computing power among the plurality of computing cores.

9. The method for providing clock frequencies for computing cores according to claim 6, wherein when the pass rate of the plurality of computing cores for normal operation at the first main clock frequency is less than the first pass rate lower threshold, the computing cores abnormally operating at the first main clock frequency among the plurality of computing cores are switched to the plurality of auxiliary clock frequency units.

10. The method for providing clock frequencies for computing cores according to claim 9, wherein the switching of the computing cores abnormally operating at the first main clock frequency among the plurality of computing cores to the plurality of auxiliary clock frequency units comprises: grade-by-grade switching the computing cores abnormally operating at the first main clock frequency among the plurality of computing cores to the plurality of auxiliary clock frequency units, the grade-by-grade switching comprising:
- grading the plurality of auxiliary clock frequency units in descending order of the auxiliary clock frequencies provided thereby;
- causing an auxiliary clock frequency unit at a highest grade providing a highest auxiliary clock frequency among the plurality of auxiliary clock frequency units to provide an auxiliary clock frequency for the computing cores abnormally operating at the first main clock frequency; and
- taking the auxiliary clock frequency unit at the highest grade as a current auxiliary clock frequency unit, and carrying out a grade-by-grade switching process on the current auxiliary clock frequency unit circularly as follows:
  - testing all computing cores for which the current auxiliary clock frequency unit provides the auxiliary clock frequency, so as to determine whether there is a computing core abnormally operating;
  - when there is a computing core abnormally operating, causing an auxiliary clock frequency unit at a lower grade next to a grade of the current auxiliary clock frequency unit to provide an auxiliary clock frequency for the computing core abnormally operating, causing the current auxiliary clock frequency unit to provide the auxiliary clock frequency for computing cores normally operating, and taking the auxiliary clock frequency unit at the lower grade next to the grade of the current auxiliary clock frequency unit as an updated current auxiliary clock frequency unit; and
  - when there are no computing core abnormally operating or there are no auxiliary clock frequency unit at a lower grade next to a grade of the current auxiliary clock frequency unit, ending the grade-by-grade switching process.

11. The method for providing clock frequencies for computing cores according to claim 9, further comprising: when external conditions change, testing operating conditions of computing cores for which each of the plurality of auxiliary clock frequency units provides a clock frequency; when a time period in which a computing core for which the auxiliary clock frequency unit provides the clock frequency keep normally operating exceeds a predetermined threshold time period, switching the computing core to a clock frequency unit that provides a clock frequency higher than the clock frequency provided by the auxiliary clock frequency unit among the plurality of auxiliary clock frequency units and the main clock frequency unit.

12. The method for providing clock frequencies for computing cores according to claim 1, the method being carried out when a chip comprising the plurality of computing cores is initialized.

13. The method for providing clock frequencies for computing cores according to claim 1, wherein when the pass rate of the plurality of computing cores for normal operation at the first main clock frequency is greater than the first pass rate upper threshold, the auxiliary clock frequency unit is caused to provide the first auxiliary clock frequency lower than the first main clock frequency for computing cores abnormally operating at the first main clock frequency among the plurality of computing cores, and the main clock frequency unit is caused to provide the second main clock frequency higher than the first main clock frequency for the remaining computing cores among the plurality of computing cores.

14. The method for providing clock frequencies for computing cores according to claim 1, further comprising: setting a plurality of clock frequency ranges and setting a corresponding clock frequency adjustment step size for each of the plurality of clock frequency ranges, wherein a difference between the first main clock frequency and the second main clock frequency is a clock frequency adjustment step size corresponding to a clock frequency range within which the first main clock frequency falls among the plurality of clock frequency ranges.

15. A chip, comprising a plurality of computing cores, and a main clock frequency unit and an auxiliary clock frequency unit for providing clock frequencies for the plurality of computing cores, wherein computing cores for which the main clock frequency unit provides a clock frequency among the plurality of computing cores, the clock frequency provided by the main clock frequency unit, computing cores for which the auxiliary clock frequency unit provides a clock frequency among the plurality of computing cores and the clock frequency provided by the auxiliary clock frequency unit are determined through the method for providing clock frequencies for computing cores according to claim 1.

16. A data processing device comprising one or more chips according to claim 15.

17. A method for improving computing power and decreasing a power consumption-computing power ratio for a computer having a plurality of computing cores, comprising:
providing a main clock frequency unit and at least one auxiliary clock frequency unit in each chip of the computer having the plurality of computing cores; and
determining, via a test, a clock frequency of the main clock frequency unit, computing cores for which the main clock frequency unit provides the clock frequency in the chip, and computing cores for which the auxiliary clock frequency unit provides a clock frequency in the chip, so as to satisfy that a pass rate of the computing cores in the chip for normal operation is greater than or equal to a set pass rate threshold;
the test is carried out when the computer having the plurality of computing cores is initialized,
wherein the determining, via a test, a clock frequency of the main clock frequency unit, computing cores for which the main clock frequency unit provides the clock frequency in the chip, and computing cores for which the auxiliary clock frequency unit provides a clock frequency in the chip comprises: executing the method for providing clock frequencies for computing cores according to claim 1.

18. A system for improving computing power and decreasing a power consumption-computing power ratio for a virtual currency mining machine, the system comprising at least one chip of a computer having a plurality of computing cores, wherein each chip comprises:
a main clock frequency unit, an auxiliary clock frequency unit and a plurality of computing cores, wherein,
the main clock frequency unit is used for providing a clock frequency for a portion of the computing cores in the chip;
the auxiliary clock frequency unit is used for providing a clock frequency for another portion of the computing cores in the chip;
the clock frequency of the main clock frequency unit, computing cores for which the main clock frequency unit provides the clock frequency in the chip, and computing cores for which the auxiliary clock frequency unit provides the clock frequency in the chip are determined via a test, so as to satisfy that a pass rate of the computing cores in the chip for normal operation is greater than or equal to a set pass rate threshold;
the test is carried out when the computer having the plurality of computing cores is initialized,
wherein determining, via a test, the clock frequency of the main clock frequency unit, computing cores for which the main clock frequency unit provides the clock frequency in the chip, and computing cores for which the auxiliary clock frequency unit provides the clock frequency in the chip comprises: executing the method for providing clock frequencies for computing cores according to claim 1.

19. A computing apparatus, comprising:
one or more processors; and
a memory storing computer-executable instructions which, when executed by the one or more processors, cause the one or more processors to execute the method for providing clock frequencies for computing cores according to claim 1.

20. A non-transitory storage medium having computer-executable instructions stored thereon which, when executed by a computer, cause the computer to execute the method for providing clock frequencies for computing cores according to claim 1.

* * * * *